(12) United States Patent
Gately et al.

(10) Patent No.: US 12,079,630 B2
(45) Date of Patent: *Sep. 3, 2024

(54) ARRAY PROCESSOR HAVING AN INSTRUCTION SEQUENCER INCLUDING A PROGRAM STATE CONTROLLER AND LOOP CONTROLLERS

(71) Applicant: Silicon Laboratories Inc., Austin, TX (US)

(72) Inventors: Matthew Brandon Gately, Austin, TX (US); Eric Jonathan Deal, Austin, TX (US); Mark Willard Johnson, Austin, TX (US); Sebastian Ahmed, San Diego, CA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/361,240

(22) Filed: Jun. 28, 2021

(65) Prior Publication Data
US 2022/0414049 A1    Dec. 29, 2022

(51) Int. Cl.
*G06F 9/345* (2018.01)
*G06F 9/32* (2018.01)

(52) U.S. Cl.
CPC ........... *G06F 9/3455* (2013.01); *G06F 9/325* (2013.01)

(58) Field of Classification Search
CPC .... G06F 9/3877; G06F 9/3879; G06F 9/3881; G06F 12/0207; G06F 9/3853
See application file for complete search history.

(56) References Cited

U.S. PATENT DOCUMENTS

| | | | | |
|---|---|---|---|---|
| 5,293,596 A | * | 3/1994 | Toyokura | G06F 12/0207 711/E12.003 |
| 5,940,876 A | * | 8/1999 | Pickett | G06F 9/30065 711/219 |
| 6,314,505 B1 | * | 11/2001 | Nakashima | G06F 9/345 711/E12.003 |
| 6,662,238 B1 | | 12/2003 | Dupuis et al. | |
| 6,671,799 B1 | * | 12/2003 | Parthasarathy | G06F 9/325 712/E9.058 |
| 7,100,019 B2 | * | 8/2006 | Norris | G06F 9/3877 712/E9.046 |
| 7,177,985 B1 | * | 2/2007 | Diefendorff | G06F 12/0862 712/237 |
| 8,914,564 B2 | | 12/2014 | David | |
| 8,954,632 B2 | | 2/2015 | Wang et al. | |
| 11,138,010 B1 | * | 10/2021 | Chen | G06F 9/325 |
| 11,457,423 B2 | | 9/2022 | Kukkula et al. | |
| 2005/0125644 A1 | * | 6/2005 | Barry | G06F 9/30101 712/E9.027 |
| 2006/0107028 A1 | | 5/2006 | Meuwissen et al. | |
| 2007/0083729 A1 | * | 4/2007 | Moat | G06F 9/3455 712/E9.039 |

(Continued)

OTHER PUBLICATIONS

Carbin, M. et al., "Detecting and Escaping Infinite Loops with Jolt," ECOOP'11: Proceedings of the 25th European Conference on Object-Oriented Programming, Jul. 2011, pp. 609-633.

*Primary Examiner* — Keith E Vicary
(74) *Attorney, Agent, or Firm* — Zagorin Cave LLP

(57) ABSTRACT

An apparatus includes an array processor to process array data. The array data are arranged in a memory. The array data are specified with programmable per-dimension size and stride values.

21 Claims, 21 Drawing Sheets

(56) References Cited

U.S. PATENT DOCUMENTS

| | | | |
|---|---|---|---|
| 2008/0133877 A1* | 6/2008 | Chai | G06T 1/60 |
| | | | 711/E12.002 |
| 2010/0174893 A1 | 7/2010 | Rivera | |
| 2012/0020418 A1 | 1/2012 | Sands et al. | |
| 2012/0254591 A1* | 10/2012 | Hughes | G06F 9/30185 |
| | | | 712/205 |
| 2016/0321074 A1* | 11/2016 | Hung | G06F 9/3013 |
| 2018/0173532 A1* | 6/2018 | Zbiciak | G06F 9/30036 |
| 2019/0303156 A1* | 10/2019 | Panda | G06F 9/30065 |
| 2020/0301876 A1 | 9/2020 | Hamlin | |
| 2020/0285486 A1 | 10/2020 | Chritz | |
| 2020/0371789 A1* | 11/2020 | Anderson | G06F 9/30065 |
| 2021/0216318 A1 | 7/2021 | Langhammer | |
| 2021/0374209 A1 | 12/2021 | Ray et al. | |
| 2022/0413850 A1 | 12/2022 | Gately et al. | |
| 2022/0414050 A1 | 12/2022 | Gately et al. | |
| 2022/0414051 A1 | 12/2022 | Gately et al. | |

\* cited by examiner

1. Begin Loop:    Start one or more new nested loops

2. RegLoad:       Load ALU registers from defined arrays (optionally post-incrementing pointers)
   a. Load:          Sub-phase to load registers from arrays
   b. ArrayIncr:     Sub-phase to increment array pointers 3. Compute:       ALU computation
   a. Input:         Sub-phase to select and load ALU inputs from registers
   b. Operation:     Sub-phase to execute ALU operation
   c. Output:        Sub-phase to save ALU output in register 4. RegStore:      Store ALU register into defined array (optionally post-incrementing pointer)
   a. Store:         Sub-phase to store register into an array
   b. ArrayIncr:     Sub-phase to store increment array pointer 5. EndLoop:       End/continue one or more nested loops (optionally incrementing array pointers)
   a. CountIncr:     For Loop[NUM_LOOPS] down to Loop[0]
                        Sub-phase to increment loop counter and check whether continuing/exiting loop
                        (If not exiting loop)
   b. ContinueLoop:      Sub-phase to jump to beginning of loop. Break evaluating nested loops
                     (else)
   c. ExitLoop:          Sub-phase to incr/reset array pointers, clear loop counter, continue evaluating loops d. EndProgram    Sub-phase to end program if specified

| INSTR0 | LOOP7 | LOOP6 | LOOP5 | LOOP4 | LOOP3 | LOOP2 | LOOP1 | LOOP0 |
|---|---|---|---|---|---|---|---|---|
| INSTR0 |  |  |  |  |  |  | BE |  |

Fig. 10B

| | LOOP7 | LOOP6 | LOOP5 | LOOP4 | LOOP3 | LOOP2 | LOOP1 | LOOP0 |
|---|---|---|---|---|---|---|---|---|
| INSTR0 |  |  |  | BE |  |  |  |  |

Fig. 10C

| | LOOP7 | LOOP6 | LOOP5 | LOOP4 | LOOP3 | LOOP2 | LOOP1 | LOOP0 |
|---|---|---|---|---|---|---|---|---|
| INSTR0 |  |  |  |  |  |  |  | B |
| INSTR1 |  |  |  |  |  |  |  | E |

Fig. 10D

| | LOOP7 | LOOP6 | LOOP5 | LOOP4 | LOOP3 | LOOP2 | LOOP1 | LOOP0 |
|---|---|---|---|---|---|---|---|---|
| INSTR0 |  |  |  |  | B |  |  |  |
| INSTR1 |  |  |  |  | E |  |  |  |

Fig. 10E

| | LOOP7 | LOOP6 | LOOP5 | LOOP4 | LOOP3 | LOOP2 | LOOP1 | LOOP0 |
|---|---|---|---|---|---|---|---|---|
| INSTR0 |  |  |  |  |  |  |  | B |
| INSTR1 |  |  |  |  | BE |  |  | E |

Fig. 10F

| | LOOP7 | LOOP6 | LOOP5 | LOOP4 | LOOP3 | LOOP2 | LOOP1 | LOOP0 |
|---|---|---|---|---|---|---|---|---|
| INSTR0 |  |  |  | BE |  |  |  | B |
| INSTR1 |  |  |  |  |  |  |  | E |

Fig. 10G

| | LOOP7 | LOOP6 | LOOP5 | LOOP4 | LOOP3 | LOOP2 | LOOP1 | LOOP0 |
|---|---|---|---|---|---|---|---|---|
| INSTR0 |  |  |  |  |  |  |  | B |
| INSTR1 |  |  |  |  |  | BE |  |  |
| INSTR2 |  |  |  |  |  |  |  | E |

3x3 slices from a 6x9 array

ARRAY PROCESSOR HAVING AN INSTRUCTION SEQUENCER INCLUDING A PROGRAM STATE CONTROLLER AND LOOP CONTROLLERS

CROSS-REFERENCE TO RELATED APPLICATIONS

This application is related to the following applications:

U.S. patent application Ser. No. 17/361,244, filed on Jun. 28, 2021, titled "Apparatus for Processor with Macro-Instruction and Associated Methods;"

U.S. patent application Ser. No. 17/361,250, filed on Jun. 28, 2021, titled "Apparatus for Memory Configuration for Array Processor and Associated Methods;" and U.S. patent application Ser. No. 17/361,257, filed on Jun. 28, 2021, titled "Apparatus for Array Processor with Program Packets and Associated Methods."

TECHNICAL FIELD

The disclosure relates generally to electronic processors and, more particularly, to apparatus for array processors with improved characteristics, functionality, and/or features, and associated methods.

BACKGROUND

Advances in information processing have resulted in increasing demands for processing power. Examples include faster and more capable processors, faster graphics or video hardware, and faster and larger memory.

In some applications, array processing is desired. Array processing is used in a variety of areas of technology. For example, when matrix manipulation is desired, an array processor may be used advantageously.

The description in this section and any corresponding figure(s) are included as background information materials. The materials in this section should not be considered as an admission that such materials constitute prior art to the present patent application.

SUMMARY

A variety of apparatus and associated methods are contemplated according to exemplary embodiments. According to one exemplary embodiment, an apparatus includes an array processor to process array data. The array data are arranged in a memory. The array data are specified with programmable per-dimension size and stride values.

According to another exemplary embodiment, an apparatus includes an array processor to process array data. The array processor includes an instruction sequencer, and an array controller coupled to the instruction sequencer.

According to another exemplary embodiment, a method of processing array data arranged in a memory is provided. The method includes using an array processor to process the array data. The array data are specified with programmable per-dimension size and stride values.

BRIEF DESCRIPTION OF THE DRAWINGS

The appended drawings illustrate only exemplary embodiments and therefore should not be considered as limiting the scope of the application or of the claimed subject-matter. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

FIG. 4 shows an atomic action sequence according to an exemplary embodiment.

FIGS. 10A-10G show examples of loops processed using an array processor according to an exemplary embodiment.

DETAILED DESCRIPTION

Figure 1:
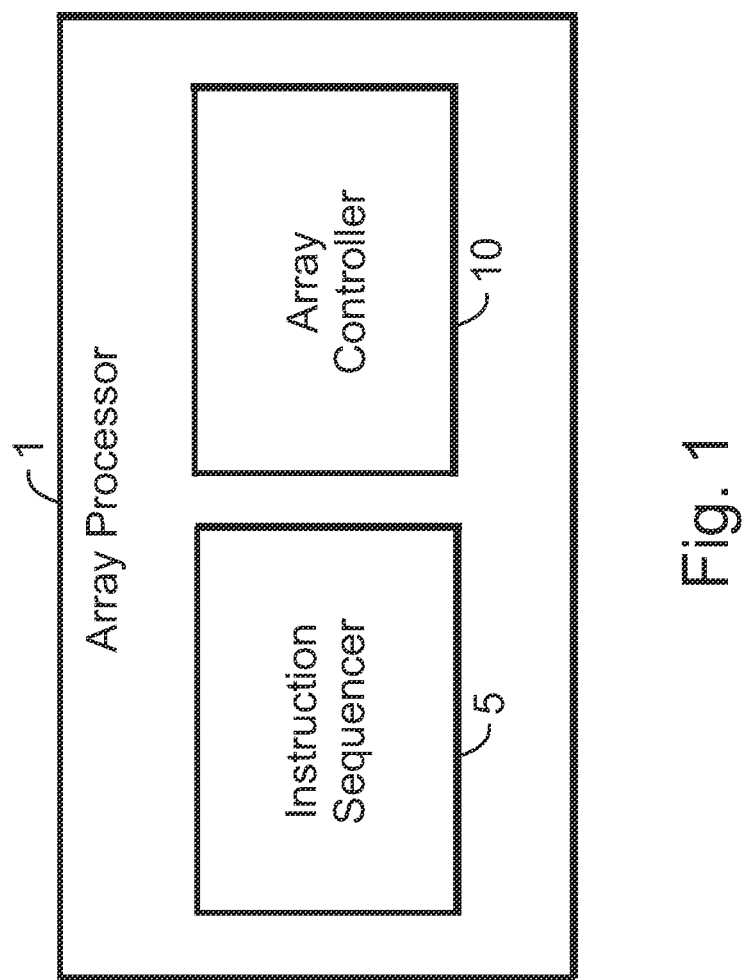
FIG. 1 shows a circuit arrangement for an array processor according to an exemplary embodiment.

The disclosed concepts relate generally to processing apparatus, such as processors for processing information. More specifically, the disclosed concepts provide apparatus and methods for array processors with improved characteristics, functionality, and/or features.

Array processors according to various embodiments have the ability to process information in generally N-dimensional arrays, where N represents an integer greater than zero (e.g., N might have any of the values 1, 2, 3, 4, 5, 6, etc.). Array processors according to exemplary embodiments operate on arrays as streams, where each one or more operations are performed on elements of the array (e.g., each element of the array), and can be iterated in a variety of ways.

The array processors according to exemplary embodiments are domain-specific computers or processors for performing vectorized or non-vectorized operations on multi-dimensional array data. The types of operations performed on the array data can be relatively complex, e.g., combinations of nested loops, with each loop level possibly having multiple arithmetic operations and array iteration operations.

In exemplary embodiments, the array data are stored in memory in a manner that can be specified using an array configuration structure. Arrays are specified by a memory access pattern consisting of a base address and per-dimension strides and sizes. Thus, in exemplary embodiments, arrays have programmable per-dimension stride values. Stride refers to the distance between a given array element and the next or succeeding array element along a specified dimension of the array, as persons of ordinary skill in the art understand. The stride value is fixed per dimension, but can vary among various dimensions of the array, i.e., is programmable per-dimension.

In exemplary embodiments, arrays are specified by a memory access pattern that includes a base address and per-dimension stride and size values. The array processor cycles through memory accesses using array configuration information in a fixed manner rather than through random access load/store instructions. A configuration scheme is used for specifying any number of arrays (depending on available memory capacity) using a combination of address, storage type, number of elements per dimension, stride per dimension, etc. A program for such array processors includes instructions, where the instructions may cause one or more of loop controls, array iterations, or arithmetic logic unit (ALU) operations to be performed.

Unlike a general-purpose CPU, array processors according to exemplary embodiments have a custom instruction set architecture (ISA), made up of macro-instructions. A macro-instruction defines how the array processor should iterate/cycle over multiple arrays and one or more computations per entry.

In exemplary embodiments, the array processor has no conditional instructions. Thus, for a given program, the memory access pattern is pre-determined, and the only variables are the array element values themselves. The array processor differs from general vector processors as it is not a general-purpose central processing unit (CPU), but has a novel architecture, ISA, and implementation.

In exemplary embodiments, the array processor differs from Tensor Processing Units (TPUs), which are very-domain-specific architectures tailored to computing specific matrix operations. The array processors according to various embodiments have an ISA that enables iterating over any memory segments as long as the memory can be defined as arrays.

To do so, the array processors use a programmable set of macro-instructions that comprise a program, where each macro-instruction can do any number of loops, array iterations, and ALU operations, termed an atomic action sequence (AAS). In exemplary embodiments, the macro instructions are tailored to a customized pipeline based on the memory access pattern, looping, and indexing mechanisms.

Array processors according to exemplary embodiments have at least the following attributes: (1) flexible storage type (implicit conversion when reading/writing from memory into the ALU arithmetic type); (2) novel macro-instruction programming mechanism that describes full action sequences (implies zero-overhead looping and array iteration); (3) parallel input and output bus that enables throughput of 1 ALU operation per cycle; (4) flexible N-dimensional array configuration that enables in-place views such as transpose, sub-blocking, reverse iteration, etc. (saves data movement time since array storage in memory is not rearranged, and saves intermediate memory overhead entailed when copying and moving memory around); and (5) ALU input transformations (allow in-place negation, conjugation, and real/imaginary separation). The above attributes are described below in detail.

Generally speaking, array processors according to exemplary embodiments may be considered as including two main sub-blocks, one for sequencing and control and one for data routing and computation. To do so, the array processors in exemplary embodiments include an instruction sequencer and an array controller, respectively.

FIG. 1 shows a circuit arrangement for an array processor 1 according to an exemplary embodiment. The array processor 1 includes an instruction sequencer 5 and an array controller 10, as described below in detail.

Although the array processor 1 in FIG. 1 may be used as the main processor, in some situations, more complex arrangements may be used, as desired. For example, the array processor 1 may be used as part of a system that may include additional processing circuitry or controllers, etc., as desired, and as persons of ordinary skill in the art will understand.

Figure 2:
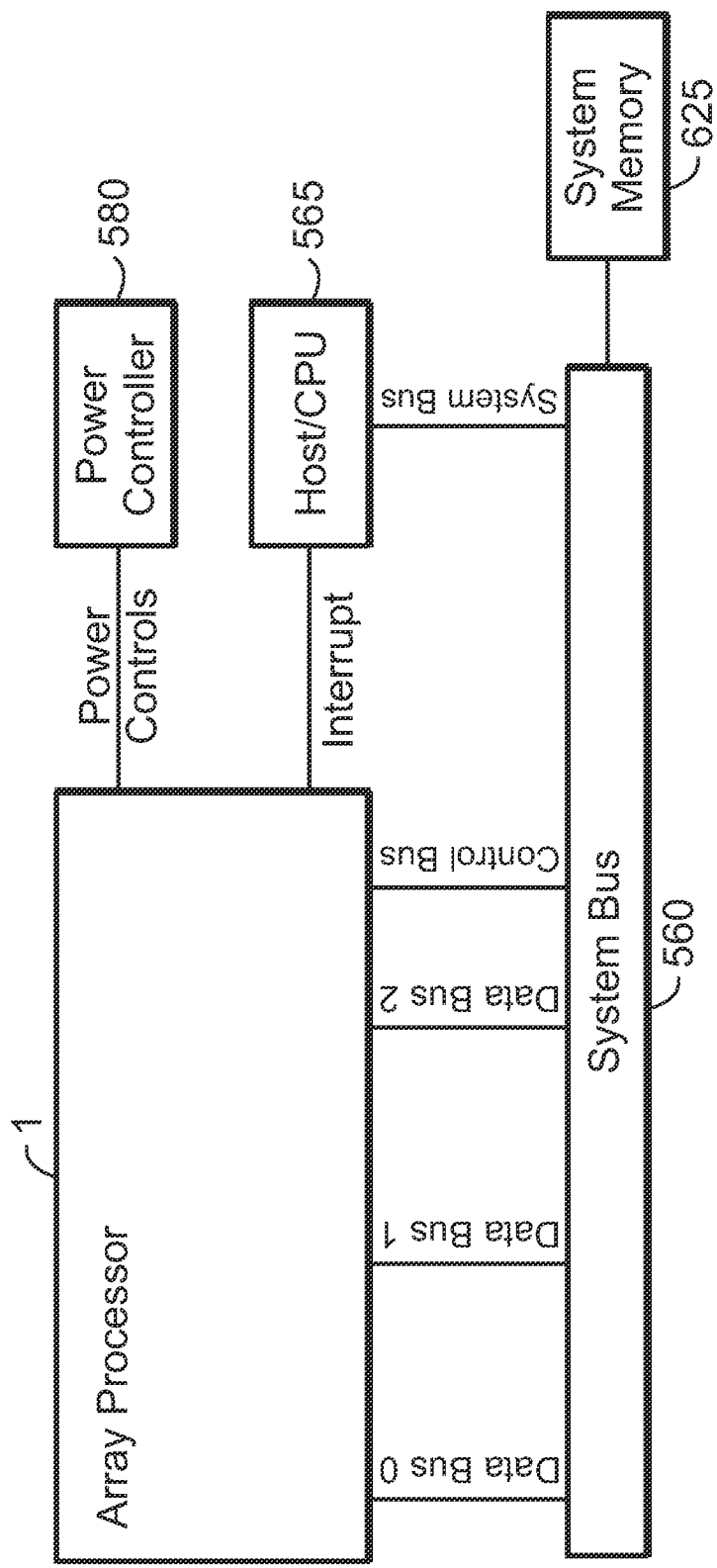
FIG. 2 shows a circuit arrangement for a system, including an array processor, according to an exemplary embodiment.

FIG. 2 shows a circuit arrangement for a system, including an array processor 1, according to an exemplary embodiment. The array processor 1 is coupled to a host/CPU 565, and can provide an interrupt signal (to signify events or situations such as completion of a task, error condition, etc.) to the host/CPU 565, as desired. The host/CPU 565 is coupled to a system bus (or generally, link) 560, through which it can communicate with a system memory 625 and the array processor 1.

The array processor 1 is coupled to the system bus 560 via one or more data buses (labeled as "Data Bus 0," "Data Bus 1," and "Data Bus 2") to communicate or transfer data to/from other blocks in the system via the system bus 560. The array processor 1 also is coupled to the system bus 560 via a control bus (labeled "Control Bus") through which it can receive control information, such as tasks to perform, etc.

Finally, the array processor 1 is coupled to a power controller 580. The array processor 1 receives one or more power control signals from the power controller 580. In response to the power control signals the array processor can assume a low-power (or sleep or standby or hibernation) mode, or a normal (full-power, processing) mode, etc., as desired, and as persons of ordinary skill in the art will understand.

Figure 3:
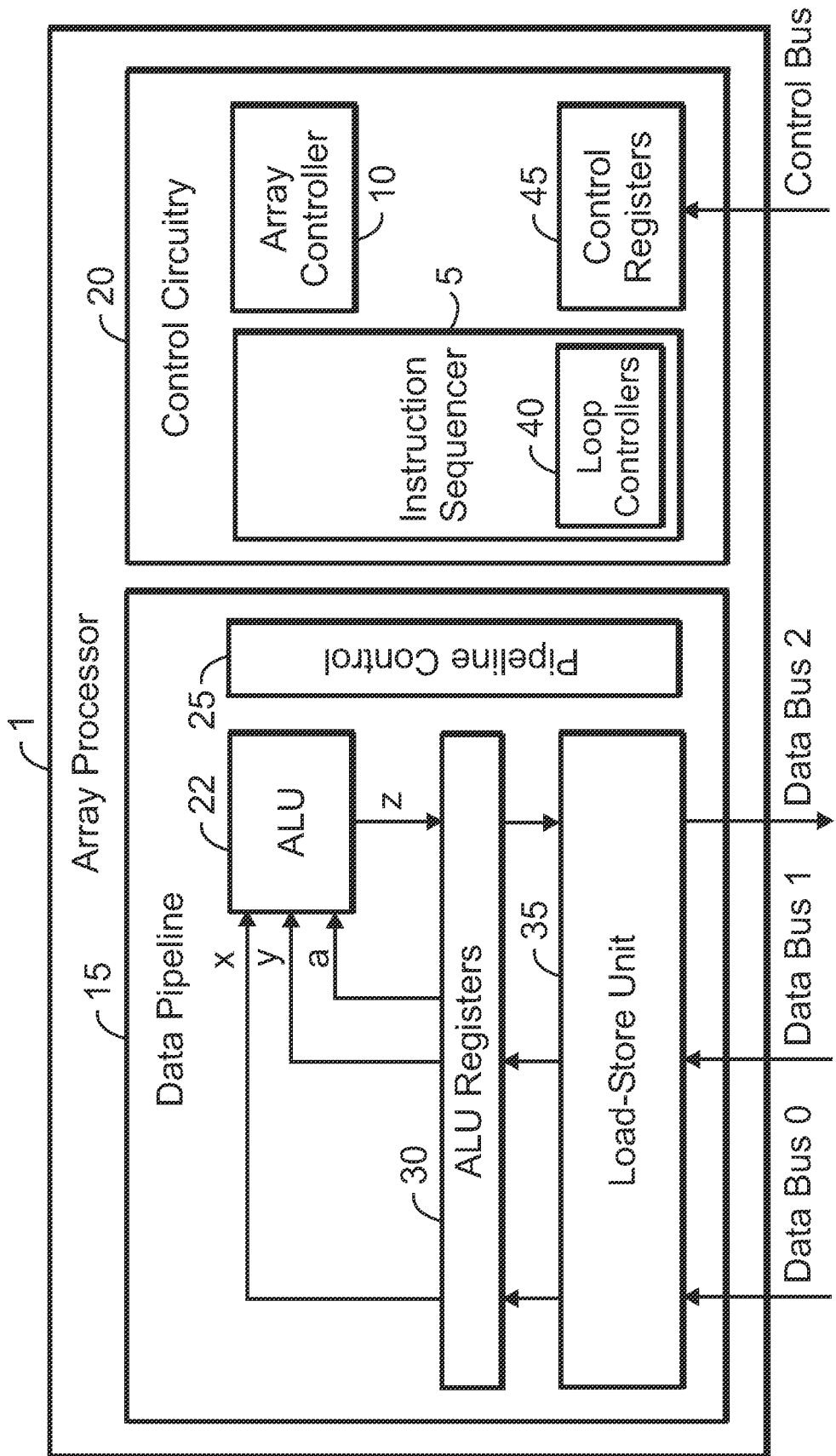
FIG. 3 shows a circuit arrangement for an array processor according to an exemplary embodiment.

FIG. 3 shows a circuit arrangement for an array processor 1 according to an exemplary embodiment. More particularly, FIG. 3 shows more details of the array processor 1 shown in FIG. 2 (which may or may not be used in a system, as noted above).

Referring again to FIG. 3, in the embodiment shown, the array processor 1 includes a data pipeline (or data pipeline circuitry) 15 and control circuitry 20. The data pipeline 15 corresponds to the data routing and computation sub-block of the array processor 1, noted above. The control circuitry 20 corresponds to the sequencing and control sub-block of the array processor 1, noted above.

The data pipeline 15 includes a load-store unit 35 which, through the data buses described above can receive data or provide data to a circuit or block external to the array processor 1. The load-store unit 35 is coupled to ALU registers 30, which are used to facilitate ALU operations. More specifically, the ALU registers provide operands (labeled x, y, and a) to the ALU 22. The ALU 22 performs desired operations, and provides the result (labeled z) to the ALU registers 30. The ALU registers 30 provide the result to the load-store unit 35, as desired. A pipeline control circuit 25 controls the operation of the various blocks and circuitry in the data pipeline 15, such as receiving data, performing desired operations, and providing results of the operations.

The control circuitry 20 includes an instruction sequencer 5, an array controller 10, and control registers 45. The instruction sequencer 5 includes one or more loop controllers 40 (described below in detail).

The control registers 45 receive control signals or data from a control bus. The control registers may also provide status information to the control bus, as desired, and as persons of ordinary skill in the art will understand. The data in the control registers is used to control the operation of the instruction sequencer 5 and the array controller 10 and, more generally, of the array processor 1.

The instruction sequencer 5 performs high-level program execution control and instruction flow control. High-level program execution control includes start/resume of the program, detection of program completion (e.g., via interrupt flag assertion), and fault reporting/handling/aborting of the program.

Instruction flow control includes program counter (PC) management, instruction decoding, instruction multiplexing, and loop management. The array controller 10 performs array state management, and array index incrementing. Details of various blocks of the array processor, such as the instruction sequencer 5 and array controller 10 are described below in further detail.

One aspect of the disclosure relates to macro-instructions, as noted above. Also as noted above, unlike a general-purpose CPU, array processors according to exemplary embodiments do not use conditional instructions. Thus, unlike a general-purpose CPU, array processors according to exemplary embodiments have a custom ISA that utilizes a novel macro-instruction paradigm.

Rather than general-purpose instructions, macro-instructions are used. The macro-instructions are compound instructions, where each macro-instruction can perform any number of loop operations, array iterations, and ALU operations (termed collectively atomic action sequence AAS), as noted above). FIG. 4 shows the AAS for an array processor according to an exemplary embodiment.

The actions in FIG. 4 are written as a sequence of steps in the order that software would cause them to be executed. Note that array processors according to exemplary embodiments are able to complete one entire sequence per clock cycle, assuming no data delays due to memory access contention. Note further that macro-instructions can achieve not only what FIG. 4 shows, but also other tasks, such as array configuration, etc., as desired, and as persons of ordinary skill in the art will understand.

As noted above, array processors according to exemplary embodiments have no conditional instructions. Thus, for a given program, the memory access pattern is pre-determined, and the variables constitute the array element values themselves. This predictability of access patterns and instruction execution allows the array processors to be pipelined to any desired level (e.g., by using the data pipeline 15, described above), and can even achieve zero-latency data movement (by pipelining the action steps in the AAS in such a manner as to give single-cycle throughput for the entire action sequence), which conventionally has been generally the case with fixed-function compute hardware, not programmable processors.

Figure 5:
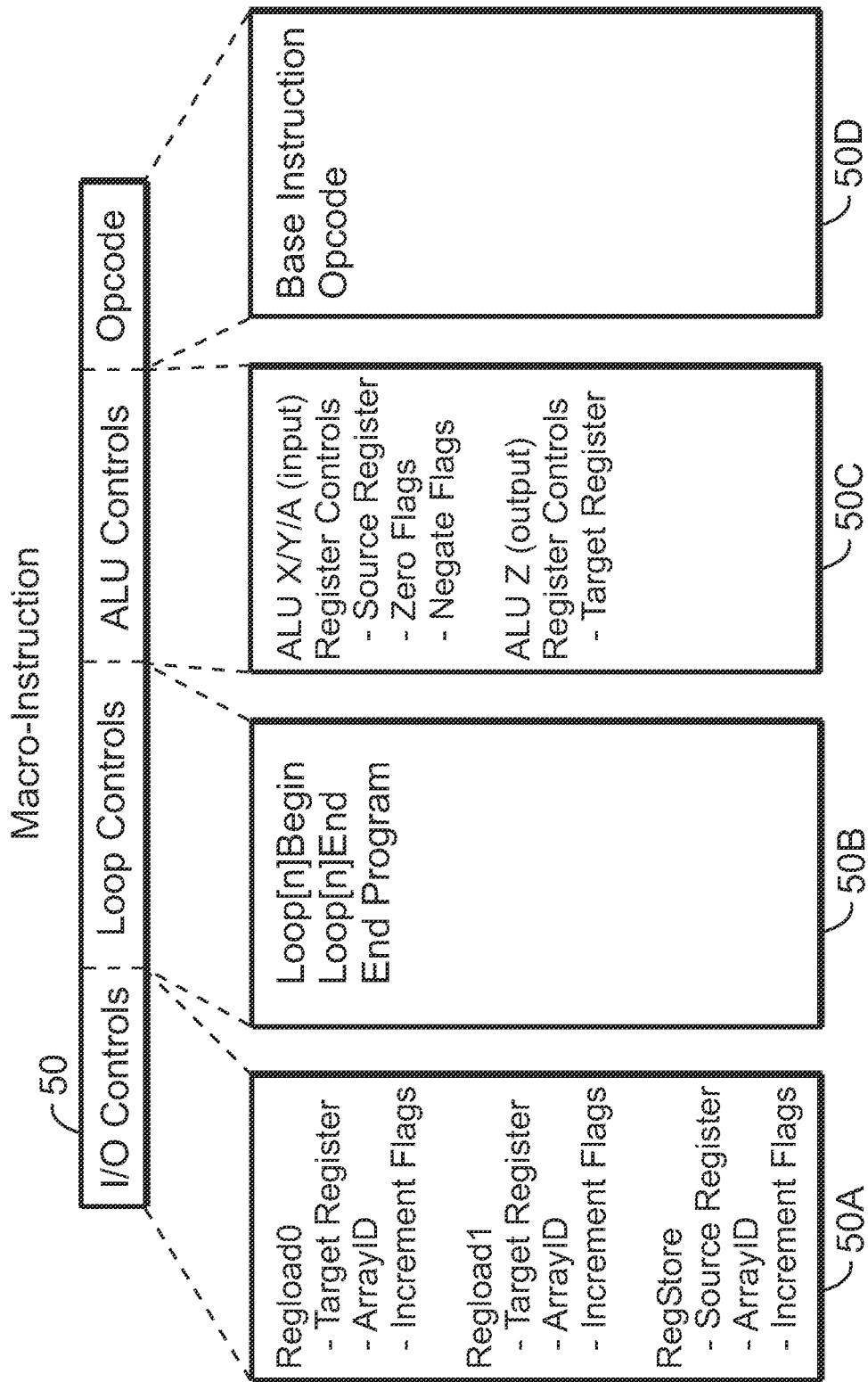
FIG. 5 shows a format for a macro-instruction according to an exemplary embodiment.

FIG. 5 shows a format for a macro-instruction 50 according to an exemplary embodiment. The macro-instruction 50 includes various fields, shown as input-output (I/O) controls 50A, loop controls 50B, ALU controls 50C, and operational code (opcode) 50D, which includes the base instruction code embedded in the macro-instruction 50. The fields 50A-50D correspond to a set of bits that comprise the macro-instruction 50.

The fields 50A-50D in the macro-instruction 50 are used for controlling the hardware of the array processor. Thus, for the example shown, the bits in the field 50A signify the I/O controls performed by the macro-instruction 50, the bits in the field 50B specify the bits that govern loop control operations, the bits in the field 50C correspond to the ALU controls, and the bits in the field 50D specify the base opcode for the macro-instruction 50. In array processors according to exemplary embodiments, the instruction sequencer 5 is responsible for decoding macro-instructions, such as macro-instruction 50 in FIG. 5, handling the loop iterations and program counter (PC) computations, as well as dispatching commands into the data pipeline 15 for memory access and associated computations.

As described above, the macro-instruction architecture in array processors according to exemplary embodiments is a novel ISA. It is comprised of compound instructions rather than single-operation instructions, as is the case with a typical conventional processor. This attribute reduces the need for conditional constructs, thus providing a fully predictable execution pipeline and memory access pattern, which in turn enable zero-latency data movement. The zero-latency data movement has been generally possible with fixed-function compute hardware, and not with a programmable processor.

Figure 6:
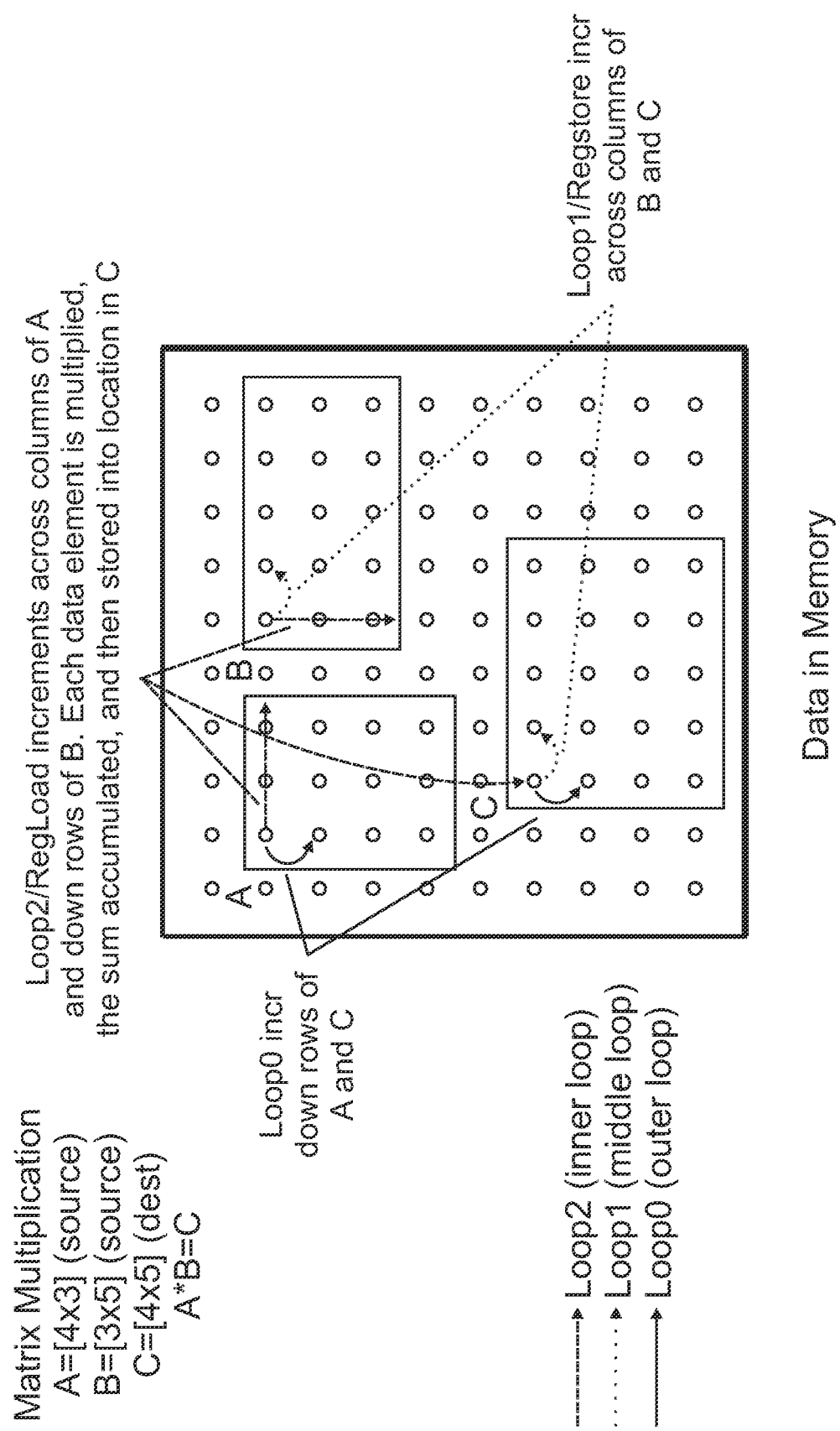
FIG. 6 shows an example of matrix multiplication, using an array processor, according to an exemplary embodiment.

As merely one example, FIG. 6 shows a matrix multiplication operation by an array processor according to an exemplary embodiment. Assuming an m×n matrix A, an n×p matrix B, multiplying matrix A by matrix B results in an m×p matrix C, using the following mathematical operation:

$$c_{ij} = a_{i1}b_{1j} + a_{i2}b_{2j} + \ldots + a_{in}b_{nj} = \sum_{k=1}^{n} a_{ik}b_{kj}$$

for $i = 1, \ldots, m$ and $j = 1, \ldots, p$.

For the example shown in FIG. 6, multiplication of a 4×3 matrix A by a 3×5 matrix B to result in a 4×5 matrix C is illustrated, i.e., the mathematical operation C=A×B. The box in FIG. 6 shows the data in memory corresponding to the matrix multiplication operation described above. Within the larger box in FIG. 6, three boxes are included that illustrate the data in memory (such as the system memory 625 in FIG. 2) that correspond to the matrices A, B, and C, respectively.

As noted above, one aspect of the disclosure relates to the instruction sequencer 5 and the role it plays in the array processors 1 according to exemplary embodiments. One function of the instruction sequencer is to take the sequence defined by the user of the array processor and to break up the sequence into individual operations to pass through the processing pipeline with each clock cycle. The ISA, as noted, uses a relatively highly parameterized yet fixed technique (no conditional instructions or branches). The instruction sequencer takes a relatively small number of instructions and generates a large number, such as hundreds, thousands, and even millions, of commands. These commands pass to the pipeline controller, one per operational cycle of the array processor.

Figure 7:
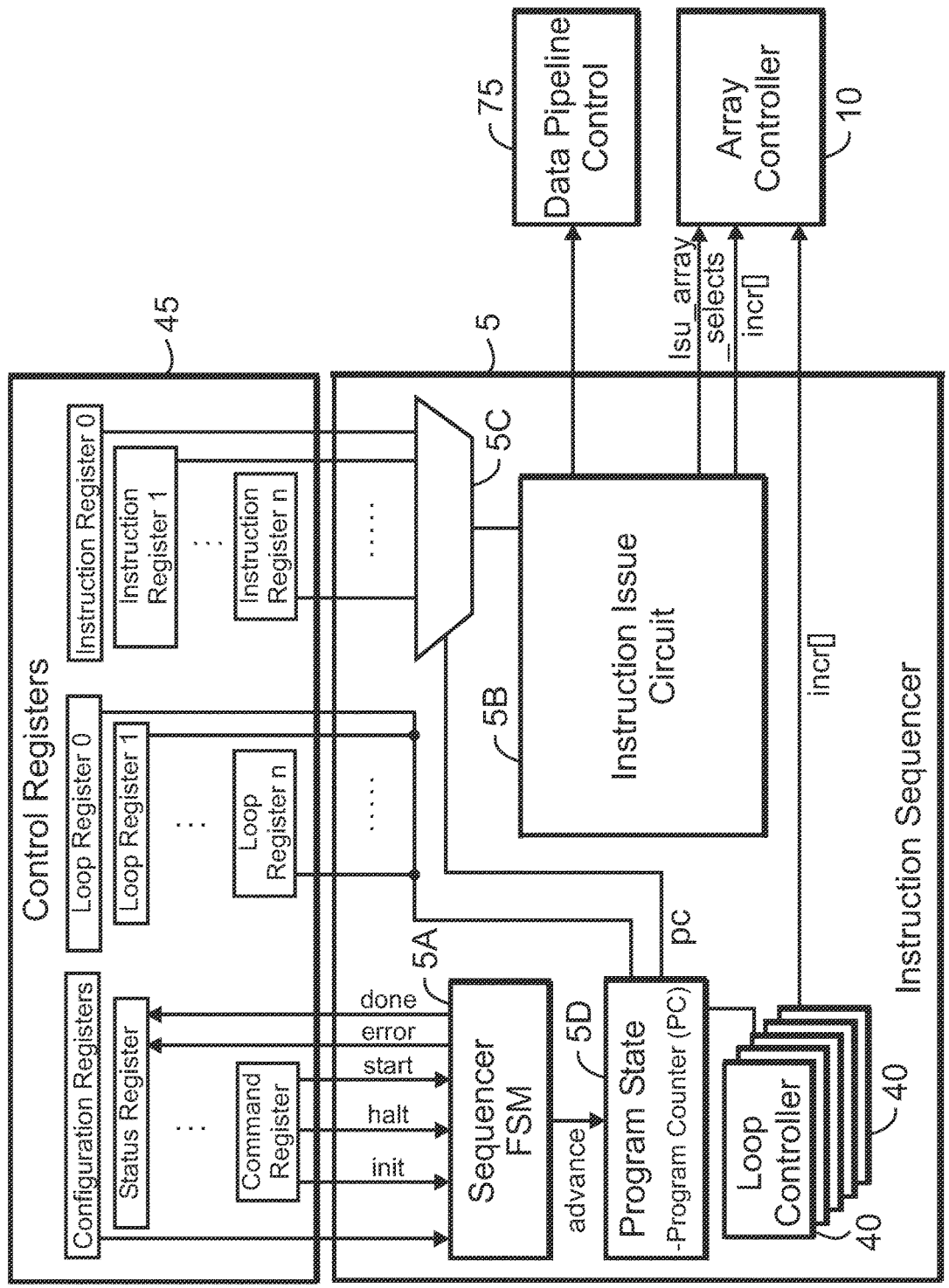
FIG. 7 shows a circuit arrangement for an instruction sequencer and associated circuitry according to an exemplary embodiment.

FIG. 7 shows a circuit arrangement for an instruction sequencer 5 and associated circuitry according to an exemplary embodiment. In the example shown, the instruction sequencer 5 includes a finite state machine, FSM (or sequencer FSM) 5A, loop controllers 40, program state logic or circuit 5D that manages the PC (program counter), instruction issue circuit 5B, and control functionality to orchestrate the flow of instructions into the data pipeline by using data pipeline control circuit 75.

The FSM 5A controls the initialization and run/halt state of the instruction sequencer 5. At the beginning of a program, the loop counters are either initialized or reloaded with values from a previously halted program. The state of the instruction sequencer 5 then transitions into an active state where instructions are issued into the data pipeline, described above. The instruction sequencer 5 will continue running until the program ends, the user halts the sequencer, or an error occurs with the FSM 5A coordinating the proper handling of the termination completion of outstanding operations before returning to the idle state, as described below in regards to FIG. 8.

Each loop defined in the architecture has a dedicated loop controller 40 that maintains the count for that loop and handles advancing and resetting of the loop at the appropriate time as well as issuing array increment operations at the end of the loop (when the counter rolls over). Each loop controller 40 is fully independent, but in exemplary embodiments the loop controllers are cascaded such that when a loop completes, it notifies the next active outer loop (via the next active loop controller) of the rollover condition to increment the outer loop. Inactive loops (loops that are not involved in the current instruction) pass the increment request to the adjacent loop controller until an active loop claims the notification.

In response to an advance signal from the FSM 5A, the program state controller 5D manages the PC (program counter) to indicate the current instruction and monitors the currently active loops and their states to determine when the program counter should advance (upon simultaneous rollover of all active loops) or jump backwards to a previous instruction upon completion of inner loops. The program state controller 5D also manages tight loops, which are loops that both begin and end on a single instruction versus non-tight loops that begin and end on different instructions and involve the PC jumping backwards in order to resume the loop.

The instruction issue circuit 5B manages the assembly of address, controls, and opcodes to be transmitted to the data pipeline 15 (not shown) for execution of numerical operations and provides that information to the data pipeline control circuit 75. That information is transmitted by the data pipeline control circuit 75 to the data pipeline 15 where data are fetched from the system memory or local registers, operated on by the current instruction, and written back to registers or system memory, respectively. Current array address pointers are provided by the array controller 10 based on the array state, which can be updated by increments coming from the loop controllers 40 or the instruction issue circuit 5B.

The instruction issue circuit 5B is responsible for decoding the current instruction (as provided by the instruction multiplexer (MUX) 5C in response to the value of the PC) and assembling all related address and control signals required for issuing an operation into the data pipeline 15 (using the data pipeline control circuit 75) by using the following operations: (a) instruction flow control, which multiplexes the current instruction based on the PC; (b) data pipeline control (memory load/store controls, and ALU computation controls); and (c) array control (array part selection controls, and array index incrementing for load/store unit(s)).

In exemplary embodiments, the instruction sequencer is coupled to the control registers 45. The control registers 45 provide various data and/or control signals to the circuitry within the instruction sequencer 5, as FIG. 7 shows. The control registers 45 receive data and/or status signals from circuitry in the instruction sequencer 5, for example status signals from the FSM 5A.

Figure 8:
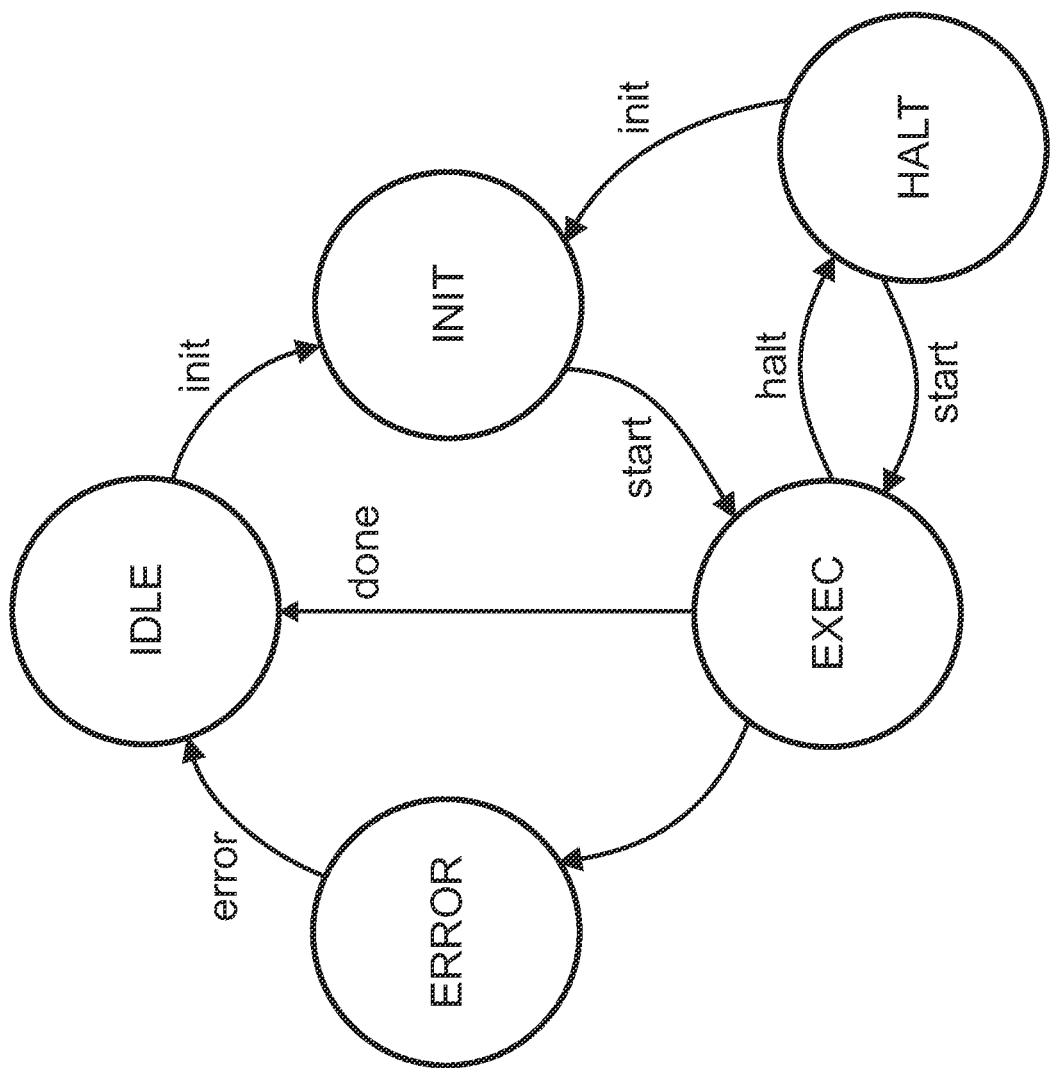
FIG. 8 shows a state diagram for controlling an instruction sequencer according to an exemplary embodiment.

The FSM 5A manages the global state of the current program, manages program initialization, and coordinates completion of commands at the end of a program or on an error condition. FIG. 8 shows the state diagram for the FSM 5A.

The IDLE state is the state at reset or after a program's completion. When returning to the IDLE state after execution of a program completes, the DONE status bit will be asserted when transitioning to this state. In the INIT state, the instruction sequencer 5 resets the PC to zero and clears all of the loop controllers 40 to their initial state.

The state machine enters the INIT state when the user's software writes INIT to the command register in the control registers 45. When in the EXEC state, the FSM 5A has a program loaded and is actively executing instructions. The FSM 5A enters the EXEC state when the user's software writes START to the command register in the control registers 45.

While executing (the EXEC state), the FSM 5A may enter the HALT state if the user's software writes HALT to the command register in the control registers 45. The FSM 5A will remain in the HALT state until the user's software restarts operations with START or terminates operation by writing the INIT bit-field. Upon successful program execution, the FSM 5A returns to the IDLE state.

The instruction sequencer 5 enters the ERROR state when an invalid or error condition occurs that terminates program execution. Examples of invalid conditions would be invalid loop control constructs, bus errors on load/store operations, or ALU faults or errors. Any appropriate cleanup (setting various fields or bits, status report, etc.) happens in this state before returning to IDLE state, upon which the ERROR status bit will be asserted.

Referring again to FIG. 7, the program state circuit 5D and the loop controllers 40 are responsible for properly advancing the PC (program counter) and loop counters based on the loop constructs in the instruction sequence. Unlike a conventional processor, array processors according to exemplary embodiments do not use explicitly encoded branch operations, but instead each instruction can have zero or more loop begin and/or end flags set.

Figure 9:
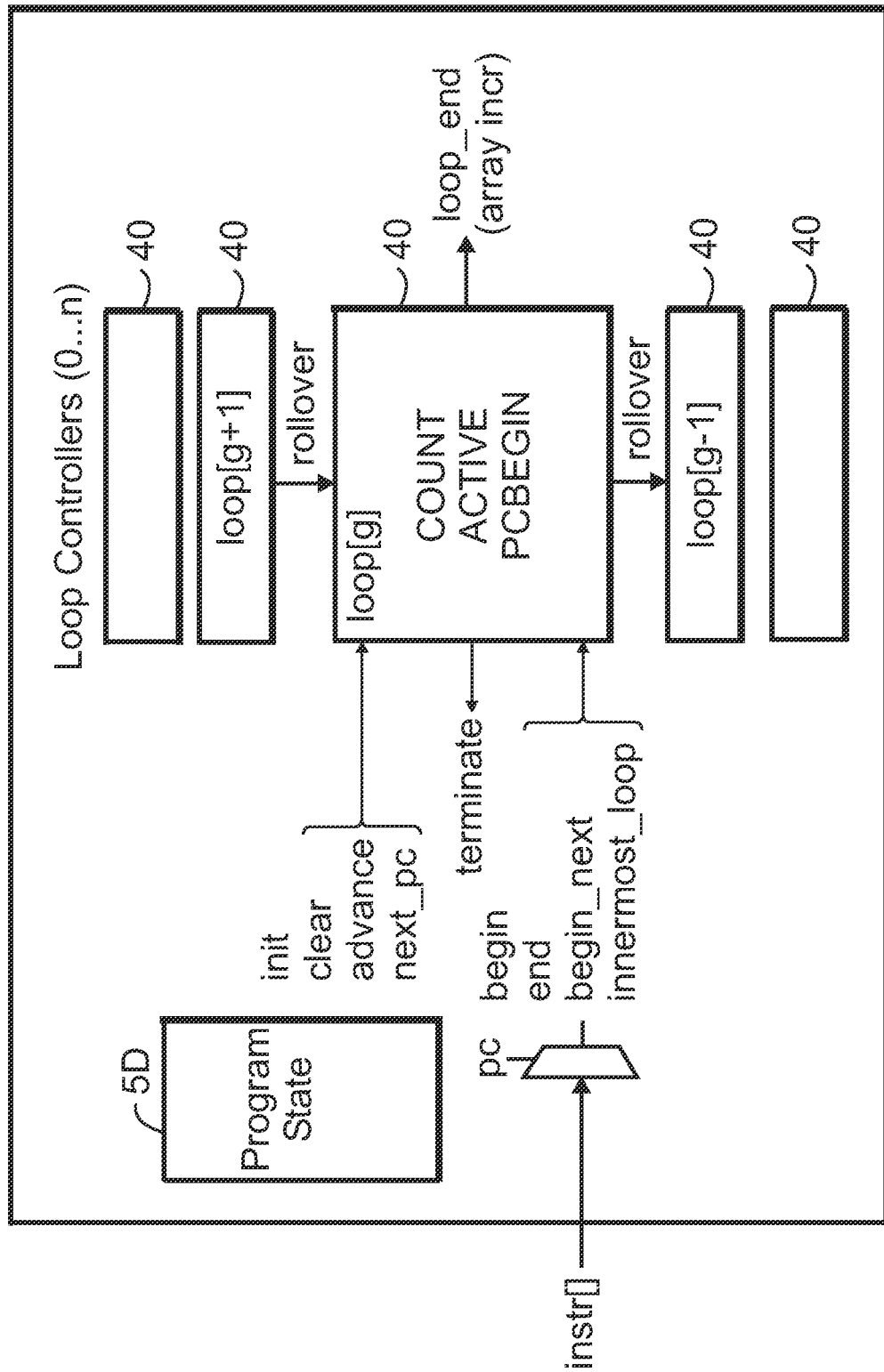
FIG. 9 shows a circuit arrangement for program state and loop controllers according to an exemplary embodiment.

FIG. 9 shows how the program state circuit 5D is coupled to the loop controllers 40. More particularly, the role of the program state circuit 5D is: (a) direct which loop counters are to be incremented in any given cycle; (b) determine whether the PC should remain the same, advance (move forward), or jump backwards based on current loop counter conditions; and (c) detect errors in the looping controls and terminate the program in such cases.

The program state circuit 5D drives the init and clear signals to each loop to indicate for the loop to be initialized (at the start of the program) or cleared (at the beginning of a new loop). The advance signal is a qualifier to notify the controllers when they need to advance their state (versus retain their current state if the pipeline is stalled and no instruction can be issued). The next_pc signal indicates the value of the program counter (PC) on the next clock cycle. It is used by the loop controllers 40 to record the PC at which a loop starts so that when the loop completes, the sequencer can jump backwards to the appropriate PC.

The PC is used as a select signal in the MUX that receives the instruction stream (labeled as "instr[ ]") in order to determine which instruction is being executed and to provide the begin and end flags from the macro-instruction to the loop controllers 40. The instruction sequencer 5 logic circuitry also constructs auxiliary controls begin_next, which indicates that a new loop begins on the following clock cycle, and innermost_loop, which determines the innermost loop that should be advanced given the current program and loop states. The loop controllers 40 each provide a terminate signal that indicates to the instruction sequencer 5 that the current loop has completed. The terminate signals from all loop controllers 40 are used by the instruction sequencer 5 to determine when all loops have been satisfied or if outer loops still need to complete. As discussed above, each of the loop controllers 40 provides a rollover signal to the succeeding loop controller 40 (with the exception of the last loop controller 40, as it does not have a succeeding loop controller).

The looping architecture of array processors according to exemplary embodiments allows several types of looping conditions. FIGS. 10A-10G provide several examples of looping conditions. In the examples in FIGS. 10A-10G, the tables show the relevant instructions and the presence of loop begin (B) or end (E) flags corresponding to each loop controller 40. N refers to the loop count for the innermost (lowest) loop counter, while M is the next higher loop counter, L denotes the next loop counter, etc.

FIG. 10A shows a situation with a single instruction tight loop in a single loop. When an instruction indicates that a loop has both BEGIN (B) and END (E) flags set, the single loop controller (LOOP1) will repeat the instruction N times before the PC advances. At the end of the N loop iterations, the loop controller will notify the array controller that arrays associated with this loop are to be incremented and the instruction sequencer will advance to the next instruction.

FIG. 10B shows a scenario with a single instruction tight loop with multiple loops. When an instruction indicates that two or more loops have both BEGIN (B) and END (E) flags set, the loops will combine to perform M×N iterations of the same instruction. At the end of the N loop iterations, the innermost loop (LOOP4) will roll over and notify the array controller that arrays associated with this loop are to be incremented. It will also notify LOOP2 that a rollover has occurred and LOOP2 will increment by one. When LOOP2 reaches its terminal count (M), both loops issue array increment notifications and the program state circuit 5D advances to the next instruction. Note that it is possible to program all loop controllers to be in a tight loop condition at once.

FIG. 10C shows a case with multiple instructions within a single loop. A single loop can iterate over multiple instructions when the BEGIN flag is in one instruction and the END flag is in another instruction. In this case, INSTR0 and INSTR1 will be repeated (in that sequence) N times until the loop completes.

In some cases, multiple instructions exist within multiple loops. Multiple instructions can be executed within multiple loops in a relatively large number of configurations, as desired, and as persons of ordinary skill in the art will understand. By way of illustration and not limitation, FIGS. 10D-10G provide some examples.

FIG. 10D corresponds to repeating INSTR0+INSTR1 N×M times. FIG. 10E shows the situation for repeating (INSTR0+INSTR1×N) M times. FIG. 10F relates to repeating ((INSTR0×N)+INSTR1) M times. FIG. 10G shows the situation for repeating (INSTR0+INSTR1×N+INSTR2×M) L times. LOOP4 repeats INSTR1 N times, LOOP2 repeats INSTR2 M times, and LOOP0 repeats the entire sequence L times.

As noted, the examples in FIGS. 10A-10G are merely illustrative. Relatively complex looping scenarios are possible by using array processors according to exemplary embodiments when multiple loops are enabled that span multiple instructions. Array processors according to exemplary embodiments can handle all possible (valid) combinations and enable iteration over complex array structures with a variety of operations.

Figure 11:
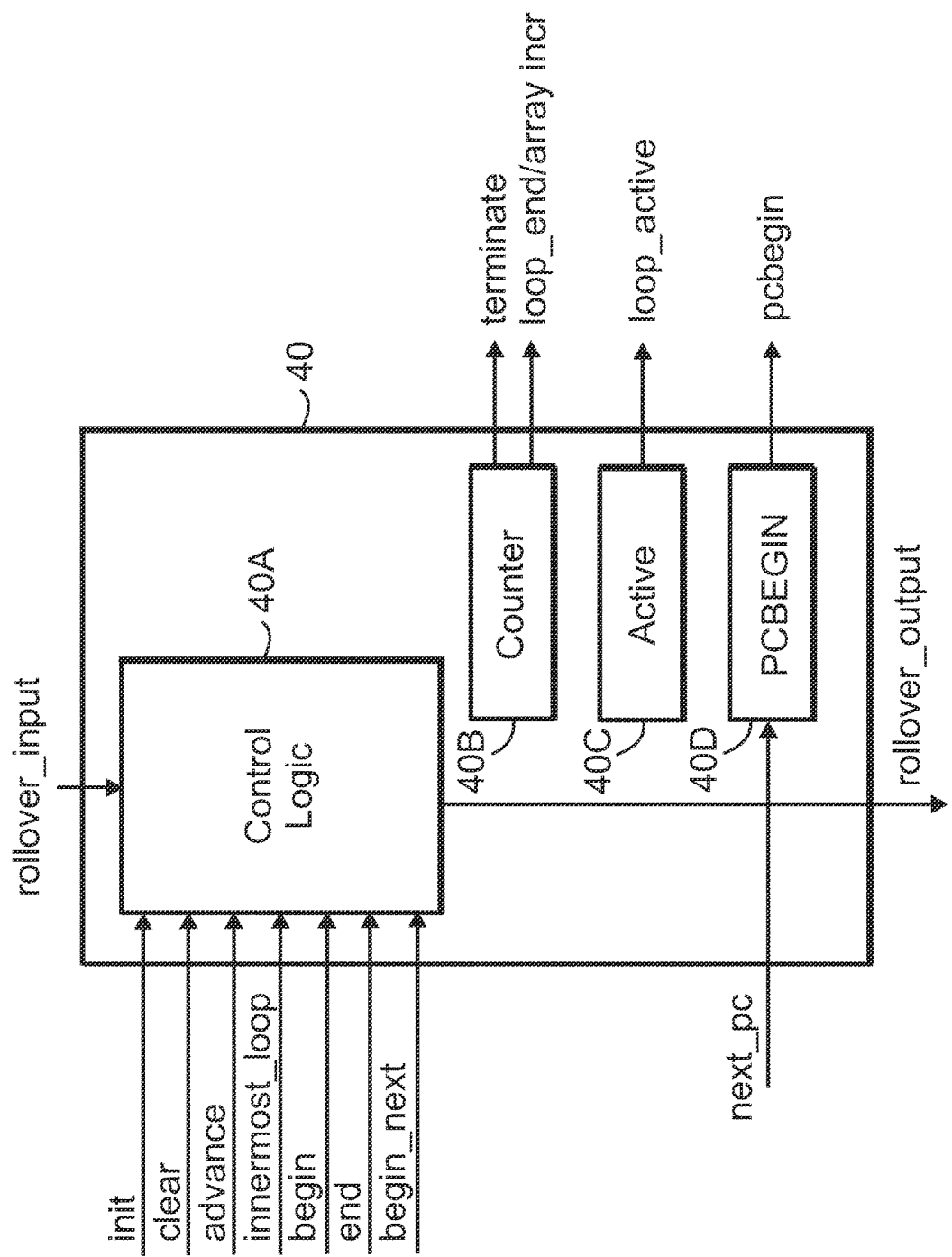
FIG. 11 shows a circuit arrangement for a loop controller according to an exemplary embodiment.

FIG. 11 shows a circuit arrangement for a loop controller 40 according to an exemplary embodiment. As noted above, in exemplary embodiments, array processors 1 include at least one loop controller and, depending on the type of processing desired, often more than one loop controller 40.

Referring to FIG. 11, the loop controller 40 includes control logic (or control circuitry or circuit) 40A, counter 40B, and registers Active (labeled as 40C) and PCBEGIN (labeled as 40D). The loop controller 40 receives several signals or flags corresponding to the current instruction, as shown by the signals provided to the control circuitry 40A), including the begin/end flags, the innermost_loop signal (generated by the program state circuit 5D) that identifies the innermost active loop at any given time, and the begin_next, which indicates to the loop controller 40 that the loop will be activated in the next clock cycle. The loop controllers also keep track of the instruction where the controller was activated by storing in the register 40D the PC which provides the program state circuit 5D with the next PC when a loop should jump backwards in order to continue its next operation. The loop_active signal indicates that the loop controller 40 is enabled and is actively performing loop counting for the current program state and it will increment when the rollover_input is asserted.

In the exemplary embodiment shown in the figures, the lower-numbered loop controllers correspond to the outer loops and higher-numbered loop controllers correspond to the inner loops. For any cycle during which multiple loop counters 40 are active, the inner-most loop will be incremented by the program state circuit 5D while active outer loops may be incremented if the preceding inner loop rolls over. When multiple loops are active, eventually an inner loop will trigger a cascade of outer loop increments as each one rolls over in turn.

Figure 12:
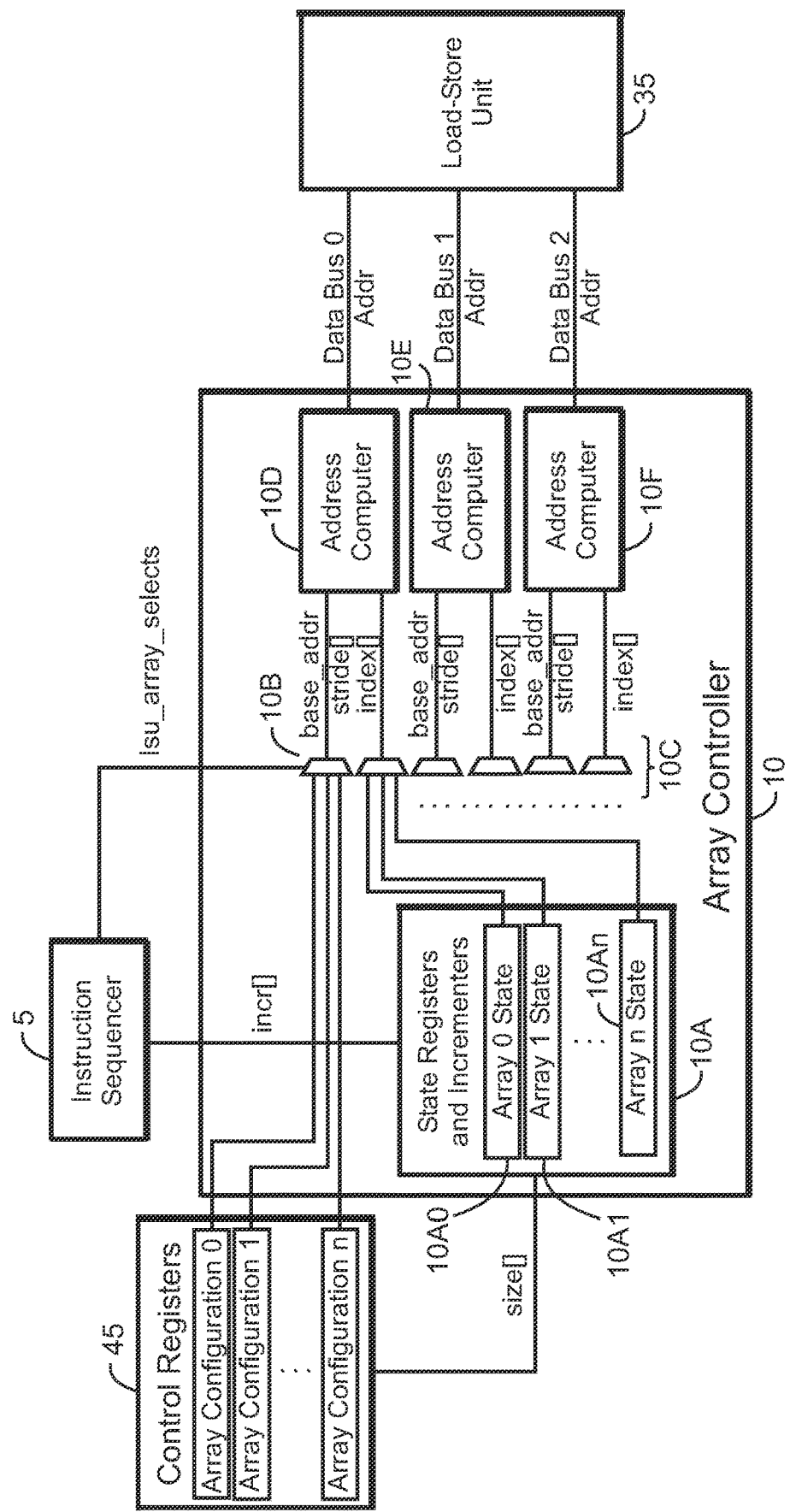
FIG. 12 shows a circuit arrangement for an array controller and associated circuitry according to an exemplary embodiment.

FIG. 12 shows a circuit arrangement for an array controller 10 and associated circuitry according to an exemplary embodiment. The array controller 10 is responsible for maintaining the state of each of the defined program arrays. Each array has a base address, size, and stride provided by its associated Array Configuration Register in the control registers 45.

Along with the static configuration from the control registers 45, the array controller 10 maintains the current array index (index[ ]) along each dimension, responding to increment requests from the instruction sequencer 5 and the loop controller(s) 40. As the instruction sequencer 5 and the loop controller(s) 40 send signals to increment the various array dimensions, the array controller 10 will update the appropriate index by incrementing by one or performing the modulo operation (rollover) if it has reached the final dimension size.

There are two sources for the increments from the instruction sequencer 5 into the array controller 10: (1) the loop controllers 40 issue an increment signal when the loop rolls over (reaches its terminal count), and (2) the load/store operations issue an increment signal when the instruction is issued to the data pipeline. Additionally, the array controller 10 has address computer circuitry 10D-10F used to compute the memory address that each load and store bus of the array processor 1 should operate on in the current instruction cycle. Note that in some embodiments each loop controller 40 (optionally) issues a multitude of increment signals. For each independent array and dimension, it may increment if configured. Similarly, each load/store may optionally increment any or all dimensions, provided the array is involved in the load/store operation.

Referring to FIG. 12, the outputs of the address computer circuitry 10D-10F, i.e., the signals "Data Bus 0 Addr"; "Data Bus 1 Addr" and "Data Bus 2 Addr") are provided to the load-store unit 35. The signals are used by the load-store unit 35 as described below.

Referring to FIG. 12, the array controller 10 includes state registers and incrementers circuit 10A, which are coupled to MUXes 10C. The state registers 10A include registers for the states of arrays 0 through n (labeled 10A0 through 10An), where n is a positive integer. The state registers and incrementers circuit 10A receives information from the control registers 45 about the configuration of the arrays (shown as Array Configuration 0 through Array Configuration n) via the "size[ ]" signals.

Information about the state of the arrays is provided by the state registers and incrementers circuit 10A to the MUXes 10C. The 1su_array_selects signals from the instruction sequencer 5 serve as the select signals for the MUXes 10C. The MUXes 10C provide the base address (base_addr), stride (stride[ ]) and index (index[ ]) signals to the address computers 10D-10F. In exemplary embodiments, for a given macro-instruction there are up to two loads and one store that may be configured. The select lines provide the choice of which array to select for each of those three I/O channels. Information about the configuration of the arrays is provided by the control registers 45 to the MUXes 10C. Each line coupling the control registers 45 and the MUXes 10C encapsulates or includes a base_addr and a stride[ ] signal. The repeating dots in the figure represent repetitions of the two-MUX pattern shown.

In exemplary embodiments, the address computer circuitry 10D-10F generates the effective address for each load and store completed by the load-store unit 35 based on which array is selected for that particular load or store operation. As an example for a 3-dimensional array, the effective address, i.e., the output of the address computer circuitry, is computed as:

$$\text{Address} = \text{BaseAddress} + [(\text{index0} \times \text{stride0}) + (\text{index1} \times \text{stride1}) + (\text{index2} \times \text{stride2})].$$

As noted, the above formula provides the effective address for a 3-dimensional array. The formula may be revised to provide effective addresses for arrays having other dimensions by making appropriate modifications, as persons of ordinary skill in the art will understand.

Figure 13:
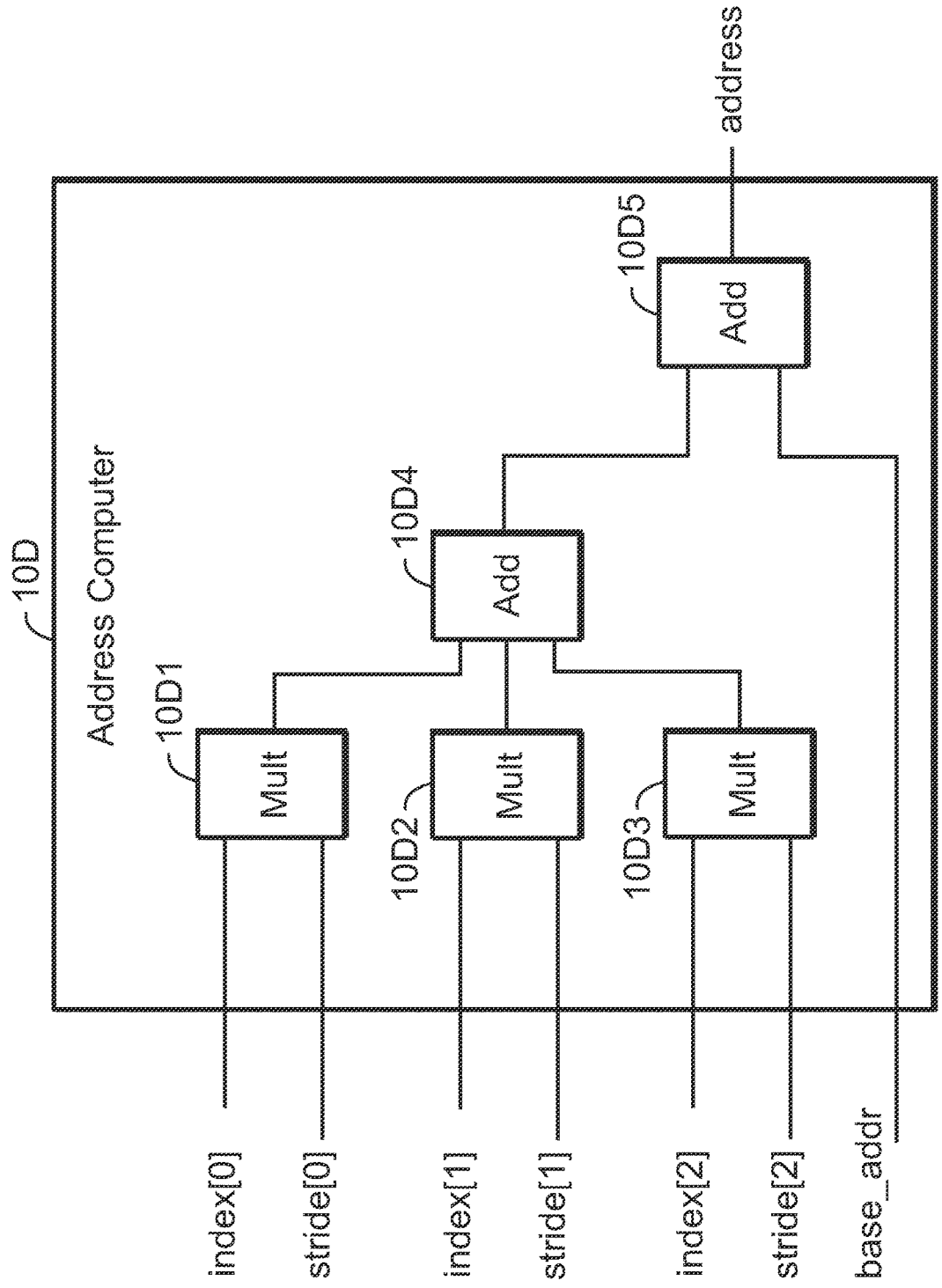
FIG. 13 shows a circuit arrangement for an address computer according to an exemplary embodiment.

FIG. 13 shows a circuit arrangement for an address computer circuitry 10D according to an exemplary embodiment. The circuitry in FIG. 13 implements the formula above for the effective address of an example 3-dimensional array. The circuitry in FIG. 13 may be revised to provide effective addresses for arrays having other dimensions by making appropriate modifications (e.g., adding or removing multipliers, etc.), as persons of ordinary skill in the art will understand. Furthermore, although FIG. 13 shows the address computer circuitry 10D, similar circuit arrangements may be used for the address computer circuitry 10E and the address computer circuitry 10F of FIG. 12, as desired, and as persons of ordinary skill in the art will understand.

Referring to FIG. 13, the address computer circuitry 10D includes three multipliers, 10D1, 10D2, and 10D3, which produce, respectively, the products (index0×stride0), (index1×stride1), (index2×stride2). An adder 10D4 adds together the outputs of the three multipliers 10D1-10D3. Adder 10D5 adds the base address (base_addr) to the output of the adder 10D4. The output of the adder 10D5 constitutes the address given by the above formula for an example 3-dimensional array.

Figure 14:
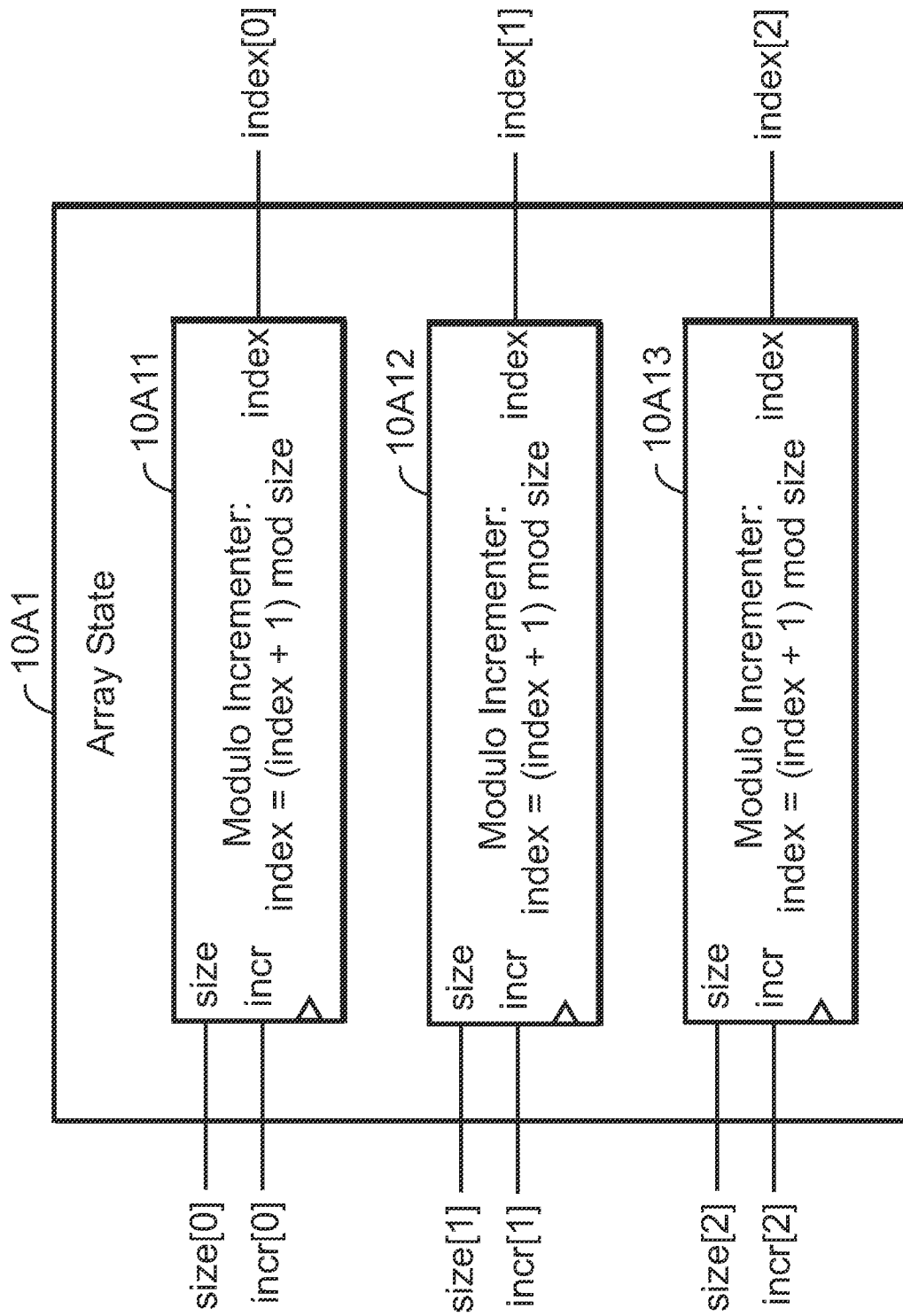
FIG. 14 shows a circuit arrangement for array state registers according to an exemplary embodiment.

FIG. 14 shows a circuit arrangement for array state registers and incrementers according to an exemplary embodiment. More specifically, the figure shows the state registers and incrementers 10A1 (see FIG. 12). Referring again to FIG. 14, the circuitry shown provides array state registers and incrementers for an example 3-dimensional array. The circuitry in FIG. 14 may be revised to provide array state registers and incrementers for arrays having other dimensions by making appropriate modifications (e.g., adding or removing modulo incrementers, etc.), as persons of ordinary skill in the art will understand.

The circuit in FIG. 14 includes three modulo incrementers 10A11-10A13, corresponding to a 3-dimensional array. The modulo incrementer for a given dimension receives as inputs the size and increment (incr) signals corresponding to that particular dimension. Using the operation shown in FIG. 14, the incrementers 10A11-10A13 produce three index signals (index[0], index[1], and index[2]) corresponding to the respective three array dimension.

As noted, the array controller 10 computes addresses during execution based on a combination of static program configuration (base_address, size, stride, storage_type) and program state (index). The base_address represents the base address of an array, i.e., the address of array origin in memory. The storage_type denotes the storage type of the array elements, e.g., 8-bit signed integer, 16-bit floating-point integer, etc. In some embodiments, implicit conversion occurs when reading/writing from memory into the ALU arithmetic type. Conversely, in some embodiments the ALU has native support for multiple types, overcoming the overhead for data type conversions.

The field size[ ] represents the per-dimension size. For instance, size[n] is the size of array along dimension n. The field stride[ ] denotes the per-dimension stride. As an example, stride[n] is the address difference between one element and the next elements along dimension n of the array. The field index[ ] constitutes the per-dimension index state. As an example, index[n] tracks the index along dimension n of the currently selected element. Note that to fully address an array elements all dimensions' indices are used.

Figure 15:
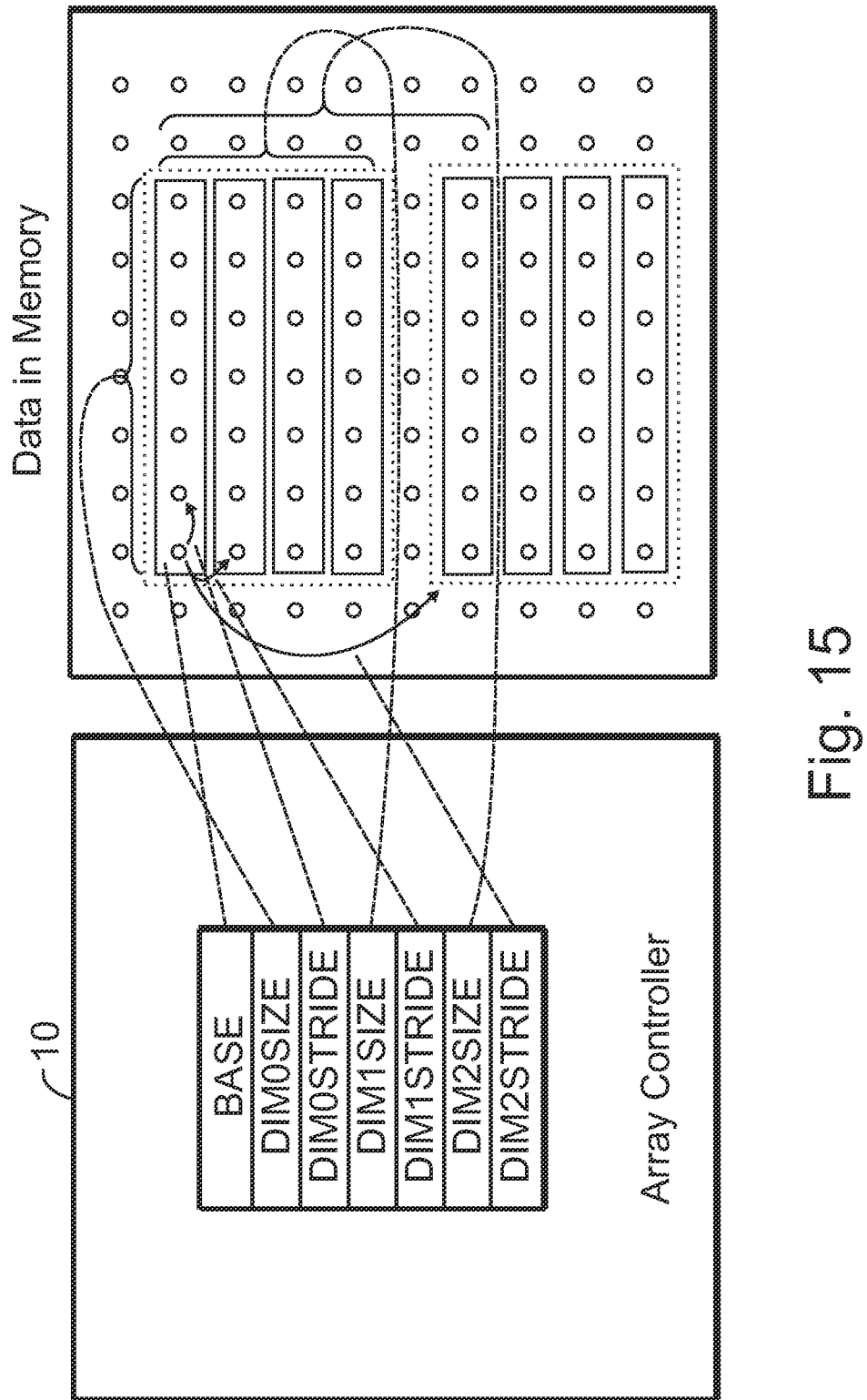
FIG. 15 shows array configuration fields according to an exemplary embodiment.

FIG. 15 shows array configuration fields according to an exemplary embodiment. More specifically, the fields in the array controller 10 for an example 3-dimensional array are mapped to the data in memory (e.g., system memory 625 in FIG. 2). The BASE field is the base address of the array. DIM0SIZE, DIM0STRIDE represent the dimension size and stride of the first dimension (dimension 0), and so forth for other array dimensions as applicable. As noted above, the 3-dimensional array is used merely as an example size of array. In various embodiments, use of other array dimensions is contemplated, by making appropriate modifications as persons of ordinary skill in the art will understand.

The "array" memory map configuration mechanism allows for a relatively flexible memory arrangement to be still traversed as an "array" from the viewpoint of an array processor 1. In particular, array processors according to exemplary embodiments can support memory slicing. More specifically, use of configurable strides allows support for arrays laid out in memory with a desired amount of spacing (or memory locations) between elements, as long as it is uniform across each dimension when taken by itself.

Figure 16:
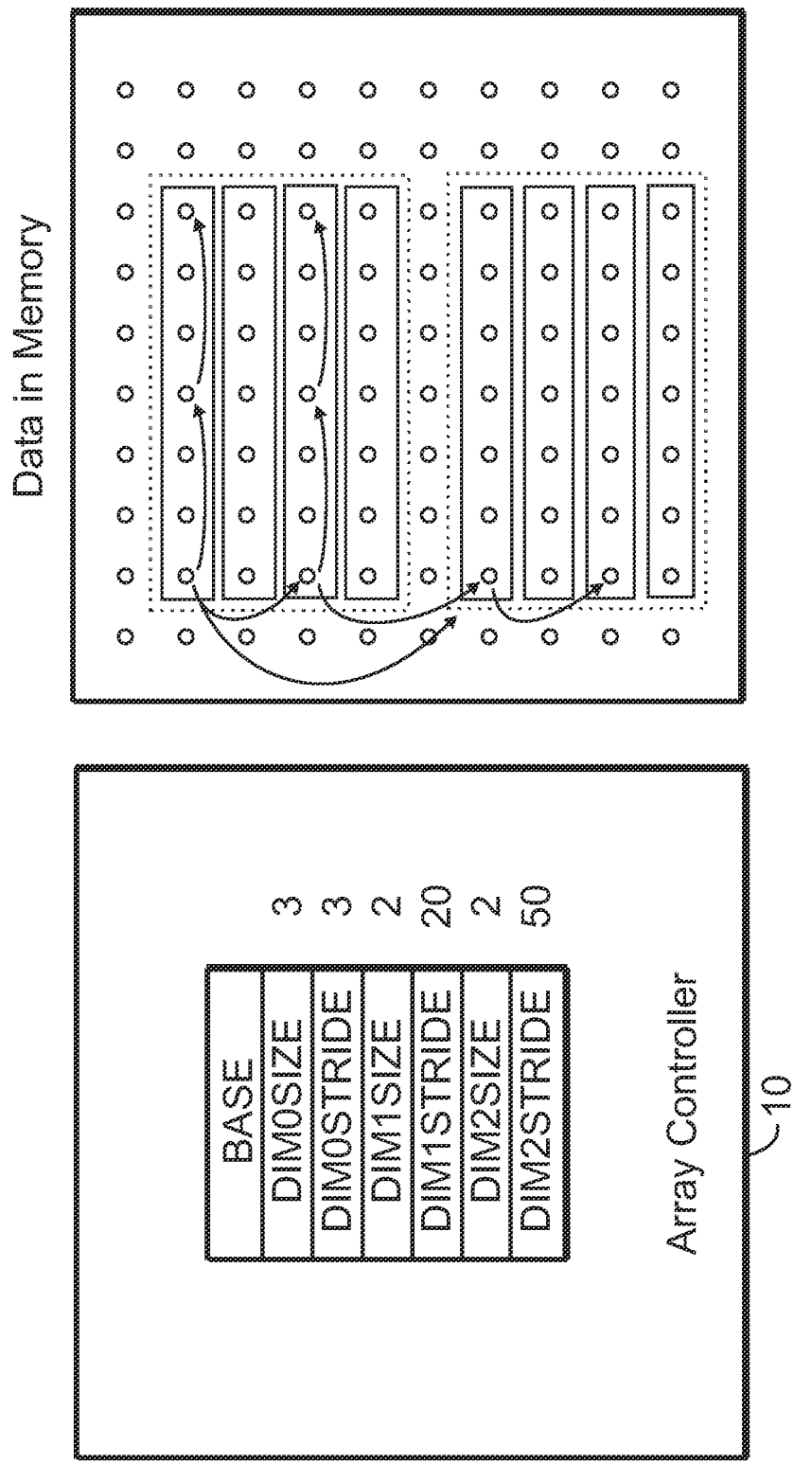
FIG. 16 shows array memory slicing according to an exemplary embodiment.

This technique may be used for flexible array processing using array processors according to exemplary embodiments. For example, FIG. 16 shows array memory slicing according to an exemplary embodiment. In the embodiment shown, DIM0SIZE, DIM0STRIDE, DIM1SIZE, DIM1STRIDE, DIM2SIZE, and DIM2STRIDE have values of 3, 3, 2, 20, 2, and 50, respectively. As illustrated in the example, the dimensions and stride values for each dimension may be configured, as desired, making possible a flexible way of representing or arranging or storing arrays in memory.

Note that FIG. 16 shows as a mere example a 3-dimensional array. Arrays of arbitrary or desired dimensional values may be used and represented in memory by making appropriate modifications to the array configuration shown, as desired, and as persons of ordinary skill in the art will understand.

In exemplary embodiments, the ability of having independent strides along each dimension means that there is no implicit row-major or column-major order assumed, but either is possible, if desired. In fact, arrays that are generated and stored in memory by one computational element in the system can be read out by array processors according to exemplary embodiments using views such as in-place transposition or reverse order iteration without entailing use of direct memory access (DMA) to rearrange elements or the program used on the array processor to change.

Figure 17A:
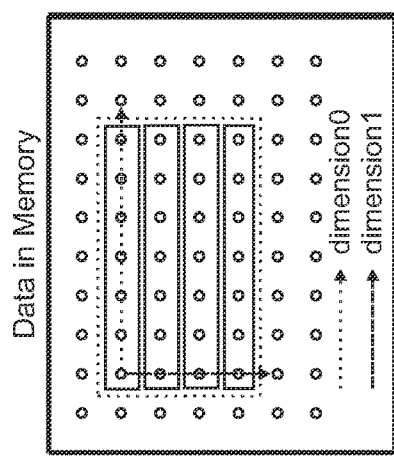
FIGS. 17A-17C show examples of matrix manipulation according to an exemplary embodiment.
Figure 17B:
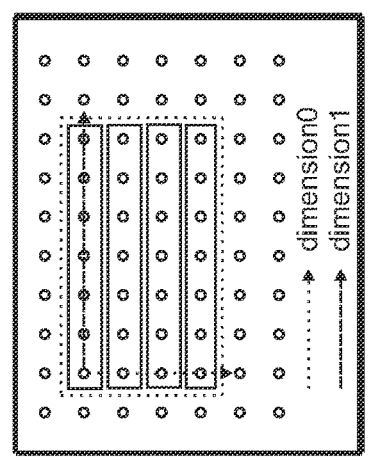
Figure 17C:
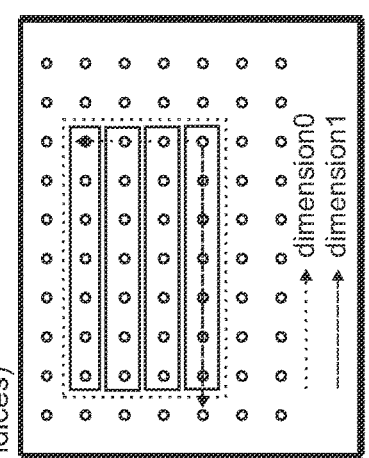

FIGS. 17A-17C show examples of matrix or array manipulation according to an exemplary embodiment. More specifically, FIG. 17A shows an array with BASE, DIM0SIZE, DIM0STRIDE, DIM1SIZE, and DIM1STRIDE having values of 11, 7, 1, 4, and 10, respectively. FIG. 17B shows a transpose operation (swap indices). The DIM0SIZE, DIM0STRIDE, DIM1SIZE, and DIM1STRIDE are changed through the operation to 4, 10, 7, and 1, respectively. FIG. 17C shows a reverse transpose (negative indices) operation. The BASE, DIM0SIZE, DIM0STRIDE, DIM1SIZE, and DIM1STRIDE values are changed through the operation to 48, 4, −10, 7, and −1, respectively.

Figure 18:
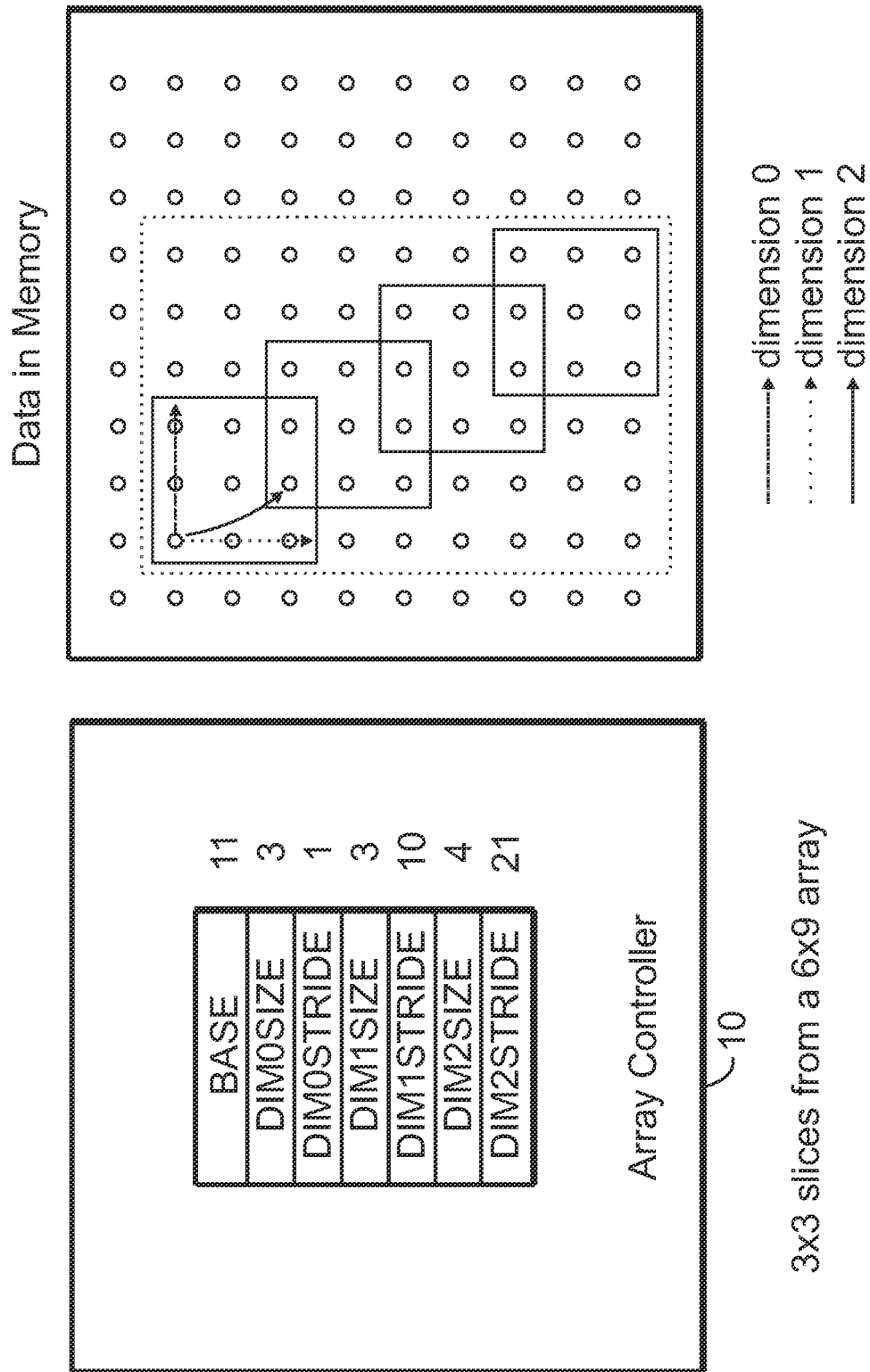
FIG. 18 shows an example of sliding windows in memory according to an exemplary embodiment.

Note that in array processors according to exemplary embodiments array configuration may be done along each index independently of other index or indices. The independent configuration of arrays along each index means that it is also possible to define certain memory access sequences as arrays, even with repeated elements, for example. As an example, FIG. 18 shows iterating through matrix or array sub-blocks as a sliding window over a larger matrix stored in memory. In the example shown, 3×3 slices are shown as the sliding window over a larger 9×6 array or matrix.

In the example shown in FIG. 18, a 3×3 window is sliding over a larger memory space, where dimension 2 controls the sliding. In this example, each dimension 2 increment slides the window down 2 rows and to the right 1 row (interpretation assumes that this memory segment represents some larger 10×10 matrix).

In some embodiments, in addition or instead of the storage format type conversion noted above, array processors include circuitry for in-place modification of array elements or values. For example, in some embodiments, in-place negation of elements or values is supported. As another example, in some embodiments, in-place masking-to-zero of elements or values is supported. In addition to the above, other modifications or changes to array elements or values may be used in various embodiments, as desired. Such modification of array elements or values may be made by making appropriate modifications, as desired, and as persons of ordinary skill in the art will understand.

Note further that the operations shown in FIGS. 16, 17A-17C, and 18 are provided as merely illustrative examples. A relatively wide variety of operations may be performed on arrays with dimensions and strides of desired values by using the flexible memory configuration schemes in array processors according to exemplary embodiments, as persons of ordinary skill in the art will understand.

Configuration of arrays in memory according to various embodiments provides a number of attributes. Such configuration allows processing of the data exclusively with a CPU. The CPU can handle arbitrary memory arrangements for the array(s). In such situations, use of the CPU resources is traded off for the flexibility of memory configuration of arrays.

In other embodiments, a DMA may be used to move and/or copy array data as desired between different computation steps. Doing so trades off flexibility and off-loading of tasks from the CPU with power and or latency, and the possibility that the DMA may not support some desired memory arrangements or translations. In some instances, duplication of information after a copy operation may occur.

Memory configuration according to exemplary embodiments matches every computation engine dealing with or processing data with every other one to arrange data in the manner used or expected by the next or succeeding or destination computation engine. Doing so entails relatively tight coupling of various hardware blocks, and might in some cases use extra storage to pad data in memory to obtain the correct or expected format for a consumer of the data (end user, various computation engines or circuit blocks or sub-systems). Note that in some situations more than one consumer of the same or overlapping pieces of data might exist, in which case a single ideal arrangement of the data might not exist.

In exemplary embodiments, the memory configuration of arrays reduces the likelihood of copying and/or moving data altogether in some cases, thus reducing power consumption (from extra on-time and extra memory accesses), reducing latency, reducing storage cost, etc. Furthermore, in such embodiments, additional applications or higher-functionality applications can be enabled with the same system resources.

In some embodiments, program packets are employed. The use of program packets involves a novel arrangement of control registers in the control block or circuitry of the array processor. As a general concept, use of packets may be applied to any peripheral device that has programmable registers that can be grouped into packets.

The use of packets allows compiling programs intended for the array processor to be compiled into a program packet. In typical past situations, registers have been written using a concept of individual register programming of configuration fields. While that method is also possible with array processors according to various embodiments, in some embodiments the hardware registers are explicitly grouped and ordered to be written and read as a "packet."

In exemplary embodiments, a program packet denotes the array processor 1 configuration registers, i.e., the information used to configure a new program for the array processor 1. An extended program packet, on the other hand, denotes the program packet and the ALU register state (ALUREGSTATE or ALUSTATE). The ALU register states are loaded in exemplary embodiments preceding the program configuration registers.

This scheme allows an extended program packet to be written to the array processor 1 (instead of a program packet) in situations where ALU register initialization is desired as part of program execution. Both program packets and extended program packets can be generated upfront (dynamically or during compile time), if desired, and stored in memory (RAM or non-volatile memory (NVM) (see, e.g., FIG. 21, NV memory 635)) for retrieving at run-time and reusing across multiple data sets.

In exemplary embodiments, in addition to the program configuration and ALU state registers, there are other run-time state registers, e.g., array state, loop state, etc., that may be included in packets. State registers hold implementation-defined state information that is written by hardware during program execution. They contain information used to represent the full context of a program in execution. To include such information, contextual program packets may be used.

More specifically, a contextual program packet constitutes the combination of an extended program packet and all the state registers. To save the context of a paused program, the full extended program packet may be stored in memory (see above). It can later be reloaded into the array processor 1 when it is desired to restore context and resume execution. Any number of programs may be saved and restored in this manner to allow switching contexts during execution, depending on factors such as use scenario, available memory, design and performance specification for the array processors 1, etc., as desired, and as persons of ordinary skill in the art will understand.

Note that the above descriptions of various types of packets assume that all the program packet registers mentioned are accessible from a host (see, e.g., FIG. 2), even the ones representing implementation-defined states. In situations where such access from a host is not available or not desired, other types of packets may be used by making appropriate modifications, as persons of ordinary skill in the art will understand.

Figure 19:
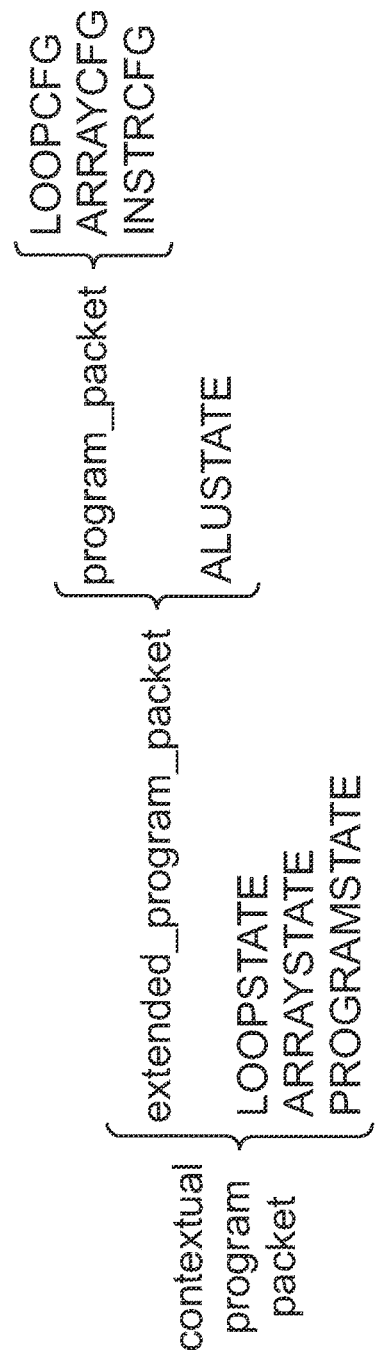
FIG. 19 shows an example of packet fields according to an exemplary embodiment.

FIG. 19 shows an example of packet fields according to an exemplary embodiment. In the example shown, program_packet includes the LOOPCFG (loop configuration), ARRAYCFG (array configuration), and INSTRCFG (instruction configuration) fields. Furthermore, extended_program_packet includes the fields of program_packet plus the ALUSTATE (ALU state) field. Finally, the contextual program packet includes the fields of extended_program_packet plus the LOOPSTATE (loop state), ARRAYSTATE (array state), and PROGRAMSTATE (program state) fields.

Note that the packet types and contents described above are merely illustrative and not limiting. Other types of packets may be constructed and used, as desired, and as persons of ordinary skill in the art will understand. The choice of type and contents of packet for a given implementation depends on a variety of factors, as persons of ordinary skill in the art will understand. Such factors include design specifications, performance specifications, cost, power consumption, IC or device area, available resources, such as memory capacity, target markets, target end-users, etc.

Figure 20:
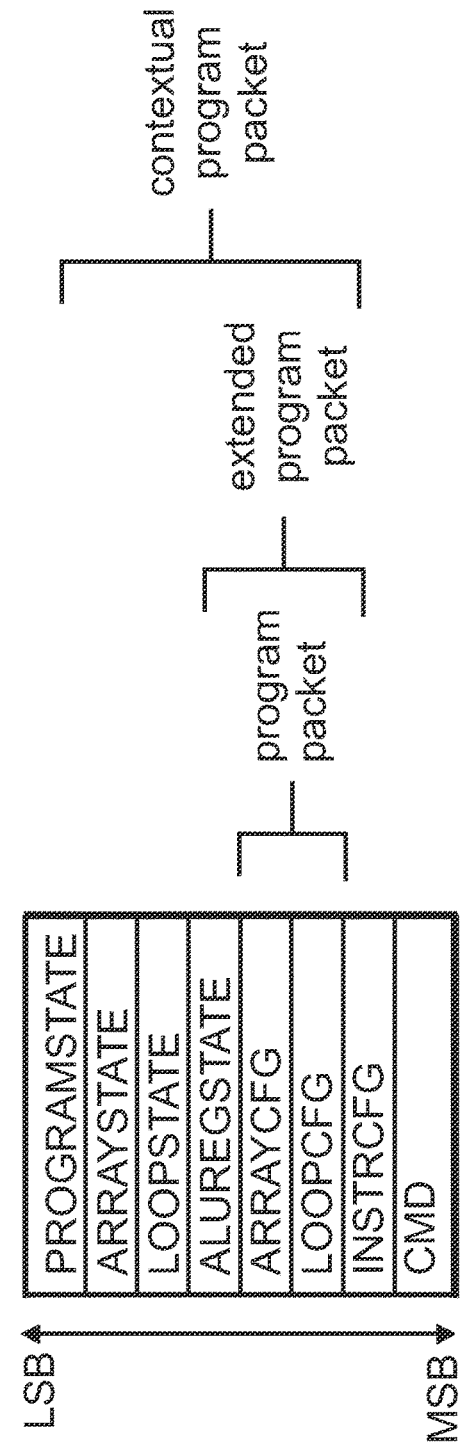
FIG. 20 shows an example of packet ordering in memory or a device according to an exemplary embodiment.

To support the use of packets, array processors according to exemplary embodiments include certain hardware blocks or circuitry. The hardware to support the above packets includes the memory mapping of the array processor organized to form register subsets that form the different packet types, where each one takes the least amount of memory space or capacity to form the packet. FIG. 20 shows the ordering of registers in memory (or a device) to support the three packet types described above.

As FIG. 20 shows, the most significant byte (MSB) in the memory space is occupied by a CMD (command) word. The rest of the memory space allocated to packets includes the fields described above. More specifically, the ordering of the fields as arranged in memory proceed from the CMD word as INSTRCFG, LOOPCFG, ARRAYCFG, ALUREGSTATE, LOOPSTATE, ARRAYSTATE, and PROGRAMSTATE. In the embodiment shown, PROGRAMSTATE occupies the least significant byte (LSB) in the memory space.

Also as FIG. 20 shows and as described above, the INSTRCFG, LOOPCFG, and ARRAYCFG form the program packet. The ALUREGSTATE, in addition to the program packet, forms the extended program packet. The LOOPSTATE, ARRAYSTATE, and PROGRAMSTATE, in addition to the extended program state form the contextual program packet. Note that some of the fields shown in FIG. 20 may not be used, depending on whether one wishes to use a program packet, an extended program packet, or a contextual program packet, as persons of ordinary skill in the art will understand.

Likewise, there are register ordering considerations that allow for autonomous loading of any of the three packet types, including a memory-mapped command register that immediately follows the program packet (see CMD in FIG. 20 as an example). In addition to the program packet memory arrangement, array processors 1 according to exemplary embodiments enable three different programming-loading use cases: (1) full program load and execution (using extended program packet); (2) partial program load and execution (using program packet); and (3) program (context) save/restore (using contextual program packet).

Such a scheme enables (pre-emptive) context switching or save/restore windowing of low-power modes where the state information would otherwise be lost. Thus, the full state and configuration of an ongoing program is supported.

The sequencer FSM 5A (see FIG. 7) allows the programmer of the array processor 1 to enable various programming models, such as those described above via the use of the start, halt, and init command bits to cause state transition of the sequencer FSM 5A (see FIG. 8). The init control bit of the CMD word activates the proper initialization of some state registers automatically in the case that a contextual program packet is not being loaded or used.

As noted above, other types of packets may be used in various embodiments, as desired. In addition, the packet types above may be mixed and/or divided and mixed, as desired, and as persons of ordinary skill in the art will understand. As merely one example, packets for the same program but different states/configurations may be supported, as desired.

To support the use of packets, use of related software is contemplated in various embodiments, as persons of ordinary skill in the art will understand. The software is intended to facilitate compiling and manipulating the various types of packets at run-time and compile-time as desired. For example, an array programming language may be used. Such a programming language might allow, for example, discrete micro-actions specified in a formal language that is similar in concept to other programming languages, such as C or Python. For example, the ability to create macros in the C programming language that match the array programming language grammar for directly embedding this language within a C program to be compiled along with it may be supported, as desired. The micro-actions in such embodiments are compiled into macro-instructions used by the array processors according to various embodiments.

In some embodiments, an instruction sequence builder (a compiler that converts from array programming language into program packets) may be used. This feature may support both on-the-fly and off-line compilation capabilities, i.e., programs can be dynamically translated at run-time or translated at compile-time and results stored into memory, as desired.

Other run-time application programming interfaces APIs may be used, as desired, such as: (1) an API for taking the different packet types and loading/storing in memory; (2) an API for doing direct memory access (DMA) programming of the array processor using one of the program packet types; and (3) an API for taking a compiled program packet and parameterizing it by modifying certain parts of the program configuration. A variety of other software constructs, including APIs, may be used, as desired, and as persons of ordinary skill in the art will understand. The choice and type of such software construct for a given implementation depends on a variety of factors, as persons of ordinary skill in the art will understand. Such factors include design specifications, performance specifications, cost, available technology, such as type of programming language(s) used, target markets, target end-users, etc. Depending on such factors, a suitable software platform may be implemented for a given application, as persons of ordinary skill in the art will understand.

Figure 21:
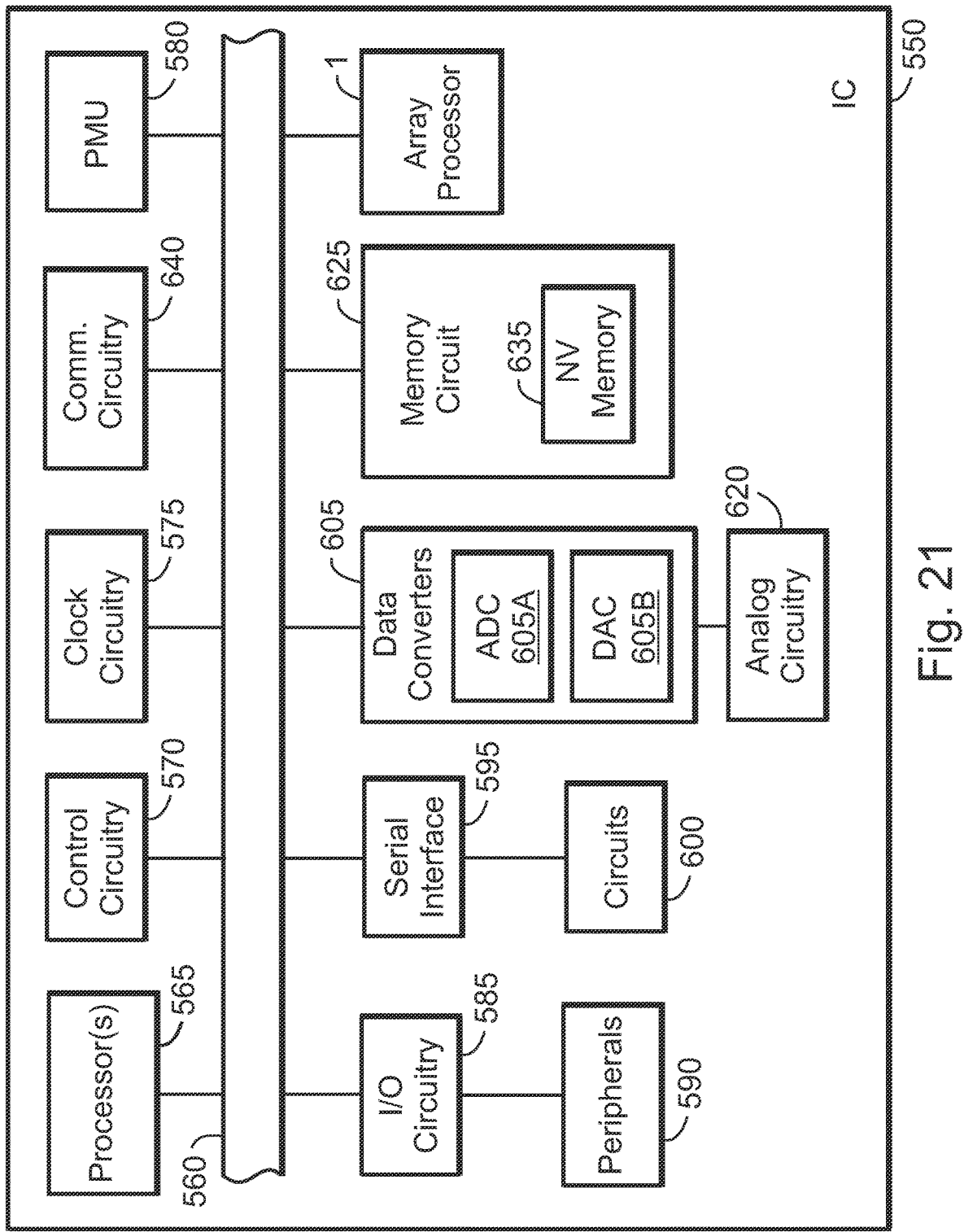
FIG. 21 shows a circuit arrangement for an IC, including one or more array processors, according to an exemplary embodiment.

Array processors 1 according to exemplary embodiments may be used in a variety of systems, sub-systems, modules, etc., as desired. For example, in some embodiments, one or more array processors 1 may be integrated or included in an IC, such as a microcontroller unit (MCU). FIG. 21 shows a circuit arrangement for such an exemplary embodiment.

The circuit arrangement includes an IC 550, which constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

IC 550 may include one or more array processors 1. The array processor 1 may be implemented in a variety of ways to have a relatively wide range of functionality and attributes, as described above. The array processor(s) 1 communicate with one or more of blocks in IC 550 via the link 560. For instance, via the link 560, the array processor(s) 1 communicate with the processor(s) 565, the memory circuit 625, the PMU (or power controller) 580, etc., as desired, and as persons of ordinary skill in the art will understand.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as persons of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as persons of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as persons of ordinary skill in the art will understand. For example, control circuitry 570 may cause PMU 580, and circuitry such as one or more array processors 1, to reset to an initial or known state.

In exemplary embodiments, control circuitry 570 may include a variety of types and blocks of circuitry. In some embodiments, control circuitry 570 may include logic circuitry, FSMs, or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as persons of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR 2, DDR 3, DDR 4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to the array processor(s) 1, as described above.

Figure 22:
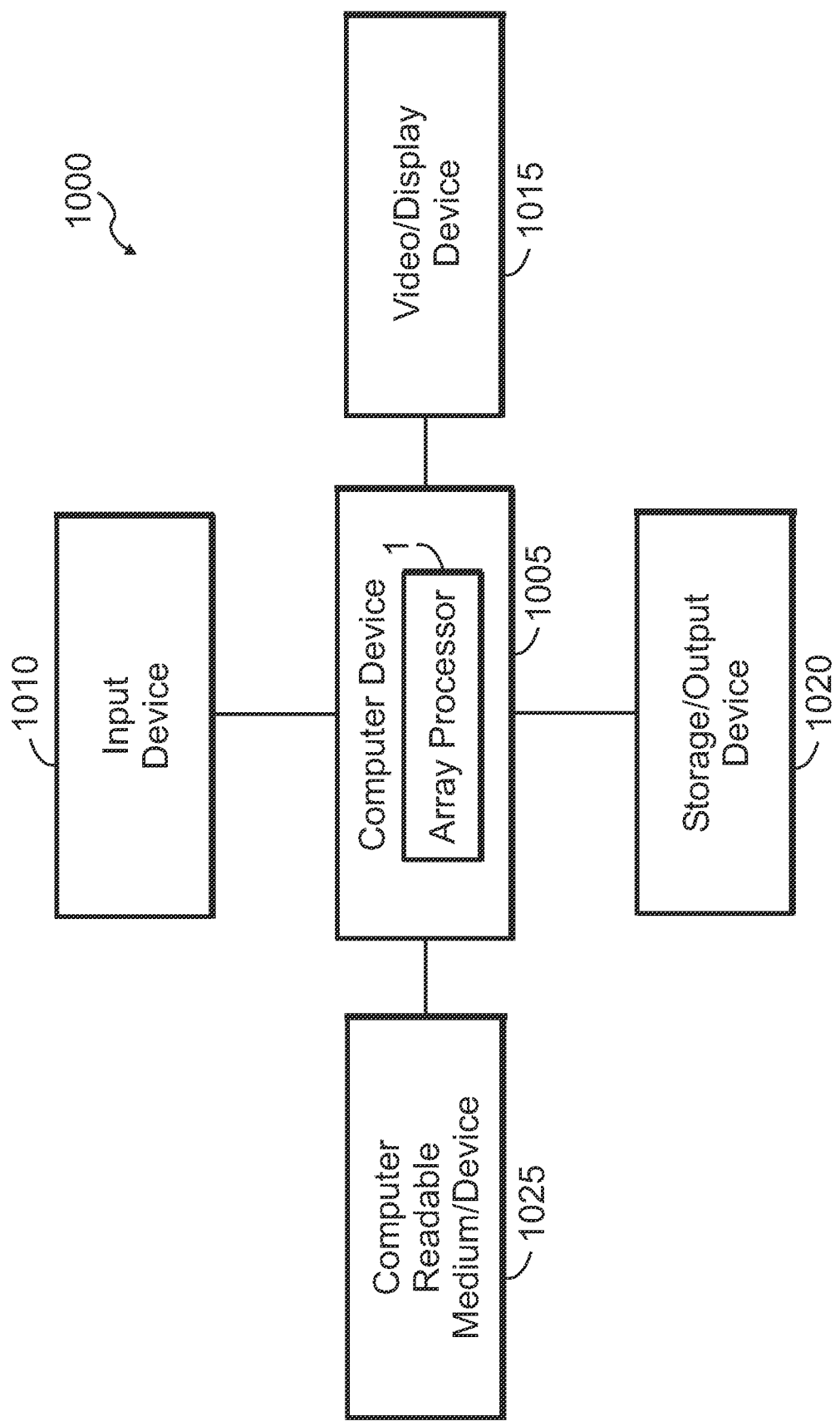
FIG. 22 shows a block diagram of a system for information processing, using one or more array processors, according to an exemplary embodiment.

FIG. 22 shows a block diagram of a system 1000 for information processing, using one or more array processors 1, according to an exemplary embodiment. Using the system 1000, one may perform, run, or execute the various algorithms, processes, methods, or software on computer systems, devices, processors, controllers, etc. The system 1000, or modifications or variations of it as persons of ordinary skill in the art will understand, may be used to run or perform a variety of processes, such as array processing by using the array processor(s) 1, as described above.

System 1000 includes a computer device 1005, an input device 1010, a video/display device 1015, and a storage/output device 1020, although one may include more than one of each of those devices, as desired. Computer device 1005 couples to input device 1010, video/display device 1015, and storage/output device 1020. System 1000 may include more than one computer device 1005, for example, a set of associated computer devices or systems, as desired.

In exemplary embodiments, computer device includes one or more array processors 1. The array processor(s) 1 may be one or more of the various embodiments of the array processor, or a combination or modification of such array processors, as persons of ordinary skill in the art will understand.

Typically, system 1000 operates in association with input from a user. The user input typically causes system 1000 to perform specific desired information-processing tasks, including array processing. System 1000 in part uses computer device 1005 to perform those tasks. Computer device 1005 includes information-processing circuitry, such as a CPU, controller, microcontroller unit (MCU), etc., in addition to one or more array processors 1, although one may use more than one such device or information-processing circuitry, as persons skilled in the art would understand. The computer device may include memory circuitry, such as memory circuitry used in conjunction with the array processor(s) 1, as desired.

Input device 1010 receives input from the user and makes that input available to computer device 1005 for processing. The user input may include data, instructions, or both, as desired. Input device 1010 may constitute an alphanumeric input device (e.g., a keyboard or keypad), a pointing device (e.g., a mouse, roller-ball, light pen, touch-sensitive apparatus, for example, a touch-sensitive display, or tablet), or both. The user operates the alphanumeric keyboard or keypad to provide text, such as ASCII characters, to computer device 1005. Similarly, the user operates the pointing device to provide cursor position or control information to computer device 1005.

Video/display device 1015 displays visual images to the user. Video/display device 1015 may include graphics circuitry, such as graphics processors, as desired. The visual images may include information about the operation of computer device 1005, such as graphs, pictures, images, and text. Video/display device 1015 may include a computer monitor or display, an electronic display (e.g., a liquid crystal display), a projection device, and the like, as persons of ordinary skill in the art would understand. If system 1000 uses a touch-sensitive display, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/ output device 1020 may include a magnetic, optical, semiconductor, or magneto-optical drive capable of storing information on a desired medium and in a desired format. As another example, storage/output device 1020 may constitute a printer, plotter, or other output device to generate printed or plotted expressions of the information from computer device 1005. In some embodiments, in addition or as an alternative to storing information, storage device 1020 may provide information (e.g., previously stored information) to one or more components or parts of system 1000, for example, computer device 1005.

Computer-readable medium 1025 (or computer program product) interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures, databases, and/or file systems). When stored, encoded, recorded, and/or embodied by computer-readable medium 1025, the functional descriptive material imparts functionality. The functional descriptive material interrelates to computer-readable medium 1025. In some embodiments, computer-readable medium 1025 is non-transitory, as desired.

Information structures within the functional descriptive material define structural and functional interrelations between the information structures and computer-readable medium 1025 and/or other aspects of system 1000. These interrelations permit the realization of the information structures' functionality.

Moreover, within such functional descriptive material, computer programs define structural and functional interrelations between the computer programs and computer-readable medium 1025 and other aspects of system 1000. These interrelations permit the realization of the computer programs' functionality. Thus, in a general sense, computer-readable medium 1025 includes information, such as instructions, that when executed by computer device 1005, cause computer device 1005 (system 1000, generally) to provide the functionality prescribed by a process, computer program, software, firmware, method, algorithm, etc., as included (partially or entirely) in computer-readable medium 1025.

By way of illustration, computer device 1005 reads, accesses, or copies functional descriptive material into a computer memory (not shown explicitly in the figure) of computer device 1005 (or a separate block or memory circuit coupled to computer device 1005, as desired). Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations.

Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional or desired tasks or operations.

Note that one may implement computer-readable medium 1025 in a variety of ways, as persons of ordinary skill in the art would understand. For example, memory within computer device 1005 (and/or external to computer device 1005) may constitute a computer-readable medium 1025, as desired.

Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired. In addition, input(s) and/or output(s) of system 1000 may be received from, or provided to, one or more networks (not shown), as desired.

Various circuits and blocks described above and used in exemplary embodiments may be implemented in a variety of ways and using a variety of circuit elements or blocks. For example, the blocks and circuitry in the array processor 1 may generally be implemented using digital circuitry. The digital circuitry may include circuit elements or blocks such as gates, digital multiplexers (MUXs), latches, flip-flops, registers, FSMs, processors, programmable logic (e.g., field programmable gate arrays (FPGAs) or other types of programmable logic), ALUs, standard cells, custom cells, gates, transmission gates, etc., as desired, and as persons of ordinary skill in the art will understand. In addition, analog circuitry or mixed-signal circuitry or both (e.g., in the IC 550 in FIG. 21) may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus comprising:
an array processor to process array data arranged in a memory,
wherein the array data are specified with programmable per-dimension size and stride values, and
wherein the array processor comprises control circuitry comprising:
an instruction sequencer configured to decode a macro-instruction into commands and configured to dispatch the commands into data pipeline circuitry,
wherein the instruction sequencer comprises a program state controller and loop controllers, the program state controller being configured to update a program counter according to the macro-instruction, and the loop controllers being configured to update loop counters according to the macro-instruction,
wherein a first loop controller of the loop controllers uses a begin flag corresponding to the first loop controller and uses an end flag corresponding to the first loop controller, the begin flag and the end flag being included in the macro-instruction.

2. The apparatus according to claim 1, wherein the control circuitry is configured to control instruction sequencing and execution by the array processor.

3. The apparatus according to claim 1, wherein the array processor further comprises an array controller configured to maintain a state of each defined program array defined by a base address, size, and stride, and provide a corresponding array address pointer based on the state.

4. The apparatus according to claim 3, wherein the array controller controls array state management and array index incrementing.

5. The apparatus according to claim 3, wherein the array processor further includes the data pipeline circuitry, wherein the data pipeline circuitry comprises an arithmetic logic unit (ALU) and a load-store unit (LSU).

6. The apparatus according to claim 5, wherein the data pipeline circuitry further comprises a pipeline control circuit.

7. The apparatus according to claim 6, wherein the pipeline control circuit controls the ALU and the LSU based on the commands.

8. The apparatus according to claim 1,
wherein each additional loop controller of the loop controllers uses a corresponding begin flag and a corresponding end flag, the corresponding begin flag and the corresponding end flag being included in the macro-instruction,
wherein each loop controller of the loop controllers uses a begin_next signal indicating that a new loop begins on a following clock cycle, and an innermost_loop signal identifying an innermost active loop, and
wherein each loop controller of the loop controllers generates an array increment notification in response to a rollover condition and generates a terminate signal that indicates to the instruction sequencer that a current loop has completed.

9. The apparatus according to claim 1, wherein the macro-instruction includes a begin flag corresponding to each additional loop controller of the loop controllers and an end flag corresponding to each additional loop controller of the loop controllers.

10. The apparatus according to claim 9, wherein the begin flag corresponding to the first loop controller of the loop controllers is set in the macro-instruction and the end flag corresponding to the first loop controller is not set in the macro-instruction, and wherein a subsequent macro-instruction includes a second begin flag corresponding to the first loop controller and a second end flag corresponding to the first loop controller, and the second end flag corresponding to the first loop controller is set in the subsequent macro-instruction.

11. An apparatus, comprising:
an array processor to process array data, the array processor comprising:
an instruction sequencer configured to decode a macro-instruction into commands and configured to dispatch the commands into data pipeline circuitry; and
an array controller coupled to the instruction sequencer,
wherein the instruction sequencer comprises a program state controller and loop controllers, the program state controller being configured to update a program counter according to the macro-instruction, and the loop controllers being configured to update loop counters according to the macro-instruction,
wherein a first loop controller of the loop controllers uses a begin flag corresponding to the first loop controller and uses an end flag corresponding to the first loop controller, the begin flag and the end flag being included in the macro-instruction.

12. The apparatus according to claim 11, wherein the instruction sequencer further comprises an instruction issue circuit.

13. The apparatus according to claim 11, wherein the array controller includes a plurality of state registers and incrementers, and a plurality of address computer circuits.

14. The apparatus according to claim 11, further comprising a memory, wherein the array data are stored in the memory with programmable per-dimension size and stride values.

15. A method of processing array data arranged in a memory, the method comprising:
decoding a macro-instruction into commands;
dispatching the commands into data pipeline circuitry;
updating loop counters of loop controllers according to the macro-instruction; and
updating a program counter according to the macro-instruction and states of the loop controllers,
wherein the array data are specified with programmable per-dimension size and stride values,
wherein updating the loop counters of the loop controllers comprises using a begin flag corresponding to a first loop controller of the loop controllers and using an end flag corresponding to the first loop controller, the begin flag and the end flag being included in the macro-instruction.

16. The method according to claim 15 further comprising:
maintaining a state of each defined program array defined by a base address, size, and stride; and
providing a corresponding array address pointer based on the state.

17. The method according to claim 15,
wherein updating the loop counters of the loop controllers further comprises using a begin_next signal indicating that a new loop begins on a following clock cycle and using an innermost_loop signal identifying an innermost active loop, and
wherein the method further comprises generating an array increment notification in response to a rollover condition and in response to a terminate signal that indicates to an instruction sequencer that a current loop has completed.

18. The method according to claim 15 further comprising:
controlling the data pipeline circuitry based on the commands.

19. The method according to claim 18 wherein controlling the data pipeline circuitry based on the commands comprises controlling an arithmetic logic unit (ALU) and a load-store unit (LSU) based on the commands.

20. The method according to claim 18,
wherein controlling the data pipeline circuitry based on the commands comprises accessing the array data in the memory based on the commands, and
wherein the array data in the memory is accessed using the programmable per-dimension size and stride values.

21. The method according to claim 15, wherein the macro-instruction includes a begin flag corresponding to each additional loop controller of the loop controllers and an end flag corresponding to each additional loop controller of the loop controllers.

* * * * *